(12) United States Patent
Woltjer et al.

(10) Patent No.: US 6,609,607 B2
(45) Date of Patent: Aug. 26, 2003

(54) ARTICLE SEPARATION CONVEYOR

(75) Inventors: Bernard H. Woltjer, Jenison, MI (US); Douglas E. Olson, Grand Rapids, MI (US); John Stafford, Grandville, MI (US); Gerald A. Brouwer, Grandville, MI (US); Ricardo N. Schiesser, Rockford, MI (US); Dennis J. Schuitema, Ada, MI (US)

(73) Assignee: Rapistan Systems Advertising Corp., Grand Rapids, MI (US)

( * ) Notice: Subject to any disclaimer, the term of this patent is extended or adjusted under 35 U.S.C. 154(b) by 94 days.

(21) Appl. No.: 09/838,964

(22) Filed: Apr. 20, 2001

(65) Prior Publication Data

US 2001/0030102 A1 Oct. 18, 2001

Related U.S. Application Data

(60) Provisional application No. 60/272,649, filed on Mar. 1, 2001, provisional application No. 60/251,685, filed on Dec. 5, 2000, and provisional application No. 60/200,043, filed on Apr. 27, 2000.

(51) Int. Cl.$^7$ ............................................. B65G 47/26
(52) U.S. Cl. ........................... 198/457.03; 198/457.05; 198/607
(58) Field of Search ............................ 198/607, 457.03, 198/457.05, 456

(56) References Cited

U.S. PATENT DOCUMENTS

| | | |
|---|---|---|
| 510,670 A | 12/1893 | Behlert |
| 938,252 A | 10/1909 | Laughlin |
| 1,268,663 A * | 6/1918 | Alvery ............... 198/457.03 |
| 1,913,533 A * | 6/1933 | Brunner .............. 198/457.03 |
| 2,296,683 A | 9/1942 | Morgan et al. ........... 80/43 |
| 2,671,549 A | 3/1954 | Lubetkin ................ 198/12 |
| 2,746,707 A | 5/1956 | Petrea .................. 249/59 |
| 3,227,263 A | 1/1966 | Kastenbein ............. 198/161 |
| 3,440,974 A * | 4/1969 | Ruiz ................ 198/457.03 |
| 3,771,641 A | 11/1973 | Jönsson et al. ........... 198/34 |

(List continued on next page.)

FOREIGN PATENT DOCUMENTS

| | | | |
|---|---|---|---|
| GB | 1002117 | 8/1965 | |
| JP | 61124459 A | 6/1986 | ............ B65H/9/14 |
| WO | WO 0006475 | 2/2000 | |

OTHER PUBLICATIONS

PCT International Search Report for International Application No. PCT/EP01/04148, filed Apr. 11, 2001.
Commonly assigned, co–pending U.S. patent application, Ser. No. 09/675,237, filed Sep. 29, 2000 by Applicants Stuart M. Edwards et al., entitled Double Width Crossbelt Sorter. 6,478,138.
Commonly assigned, co–pending U.S. patent application, Ser. No. 09/669,170, filed Sep. 25, 2000 by Applicants Artemio Affaticati et al., entitled High–Rate Induction System.

*Primary Examiner*—Douglas Hess
(74) *Attorney, Agent, or Firm*—Van Dyke, Gardner, Linn & Burkhart, LLP

(57) ABSTRACT

An article separation conveyor system includes a plurality of conveyors which are independently and/or collectively operable to destack, separate and/or align articles being conveyed along the article separation conveyor. The conveyor system includes a destacking conveyor, a side by side eliminating conveyor and/or an aligning conveyor. The destacking conveyor includes a plurality of conveying portions, which are inclined to convey articles up and then drop or guide them onto the next adjacent conveyor. The side-by-side eliminating conveyor includes a pair of diverting members and is operable to redirect articles from one side of the conveyor to the other to destack and separate articles as they are continuously conveyed along the conveyor. The aligning conveyor is operable to align articles along one side of the discharge conveyor so the articles are arranged for identification at a downstream scanning device and induction onto a sortation system.

66 Claims, 19 Drawing Sheets

U.S. PATENT DOCUMENTS

| | | | | |
|---|---|---|---|---|
| 3,799,319 A | * | 3/1974 | Cutler et al. | 198/29 |
| 3,938,654 A | | 2/1976 | Mohr | 198/287 |
| 4,120,393 A | | 10/1978 | Motooka et al. | 198/460 |
| 4,227,607 A | | 10/1980 | Malavenda | 198/460 |
| 4,240,538 A | | 12/1980 | Hawkes et al. | 198/358 |
| 4,411,353 A | * | 10/1983 | McDole | 198/457 |
| 4,527,937 A | * | 7/1985 | Tomasello, Jr. | 414/273 |
| 4,572,350 A | * | 2/1986 | Besemann | 198/372 |
| 4,751,060 A | | 6/1988 | Kratochwill | 422/268 |
| 4,763,774 A | * | 8/1988 | Johansson | 198/461 |
| 4,909,697 A | * | 3/1990 | Bernard, II et al. | 414/331 |
| 4,917,230 A | | 4/1990 | Barchman | 198/434 |
| 5,423,431 A | | 6/1995 | Westin | 209/539 |
| 5,460,271 A | | 10/1995 | Kenny et al. | 209/576 |
| 5,588,520 A | * | 12/1996 | Affaticati et al. | 198/370.06 |
| 5,638,938 A | | 6/1997 | Lazzarotti et al. | 198/445 |
| 5,655,667 A | | 8/1997 | Isaacs | 209/539 |
| 5,701,989 A | | 12/1997 | Boone et al. | 198/448 |
| 5,950,800 A | | 9/1999 | Terrell et al. | 198/448 |
| 6,015,039 A | * | 1/2000 | Bonnet | 198/840 |
| 6,259,967 B1 | | 7/2001 | Hartlepp et al. | 700/230 |
| 6,311,831 B1 | * | 11/2001 | van der Griendt et al. | 198/487.1 |
| 6,478,138 B1 | * | 11/2002 | Edwards et al. | 198/370.06 |
| 6,513,641 B1 | * | 2/2003 | Affaticati et al. | 198/370.01 |

* cited by examiner

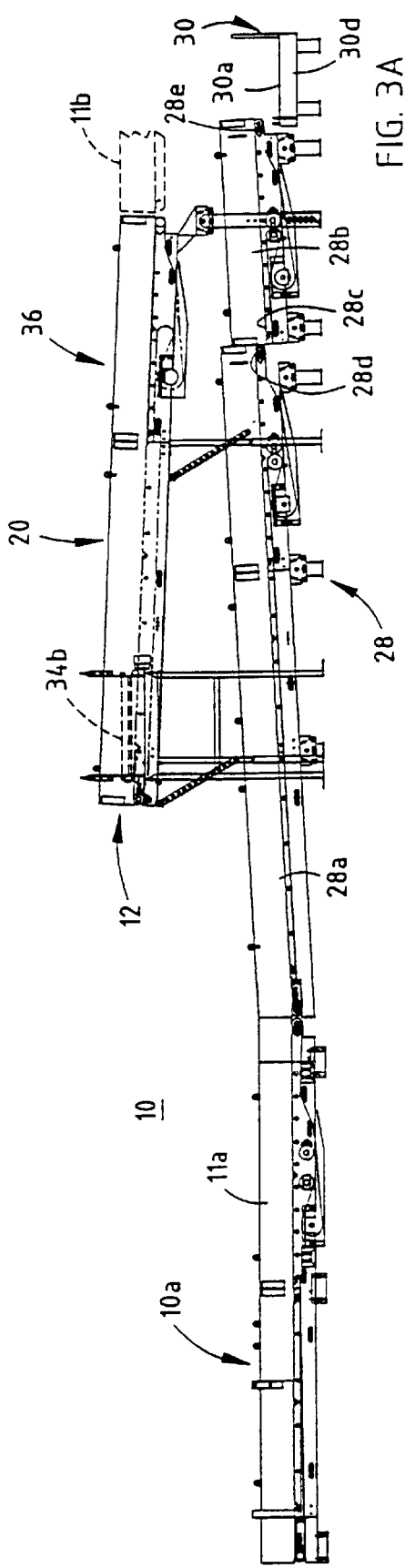
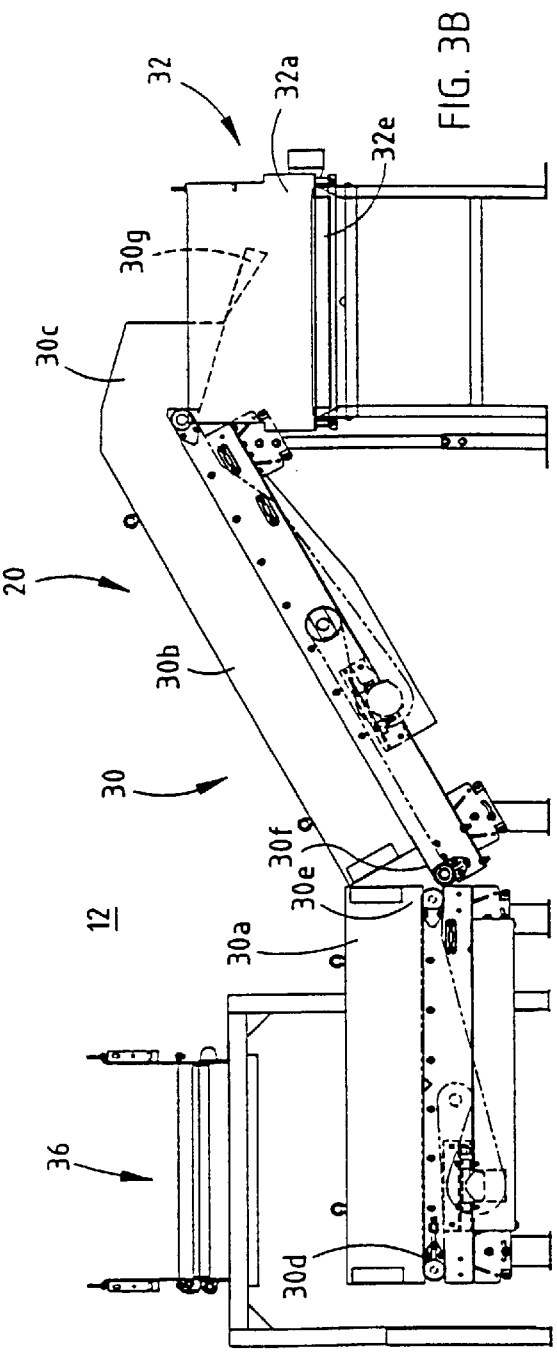
FIG. 3A
FIG. 3B

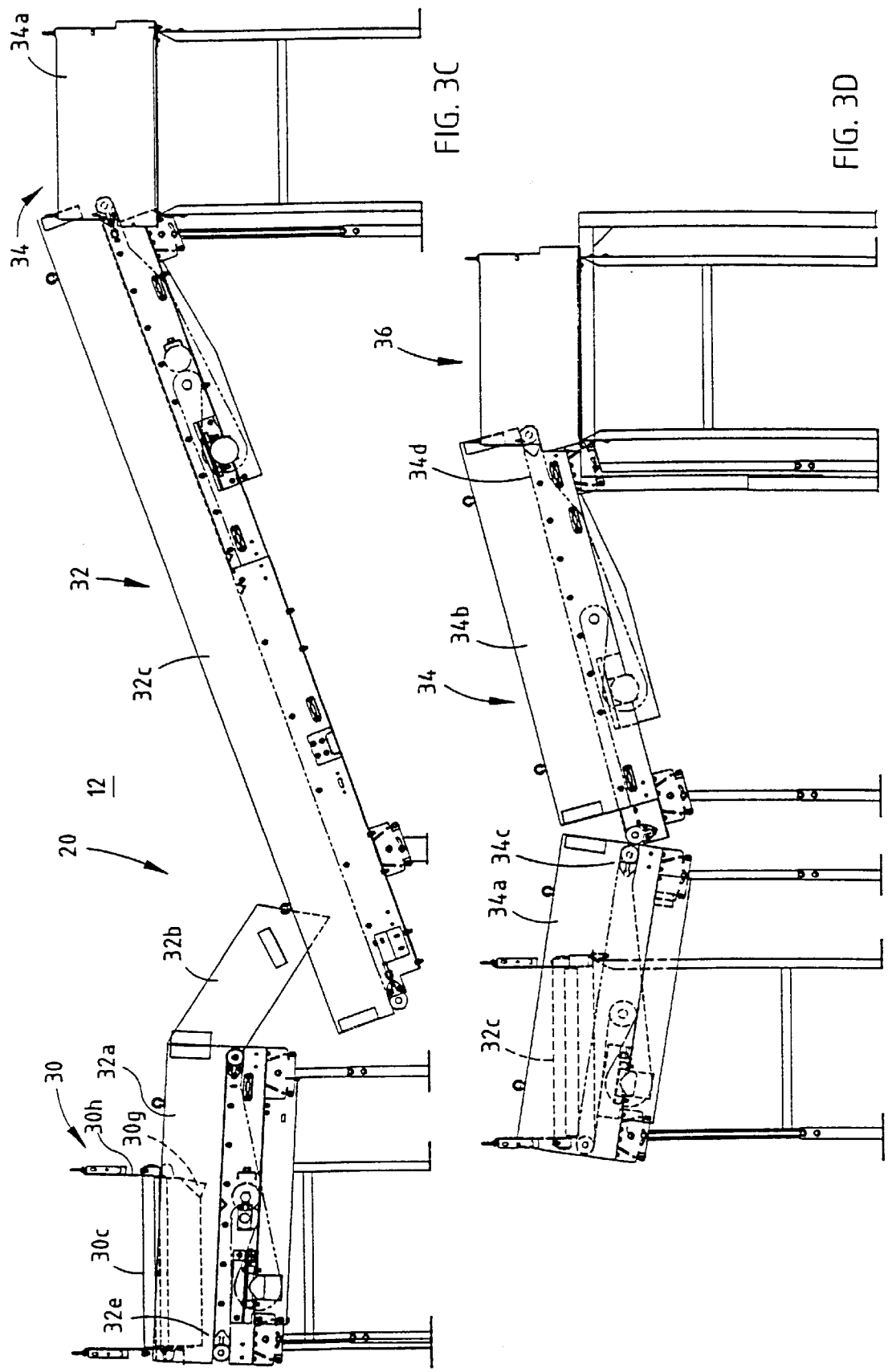

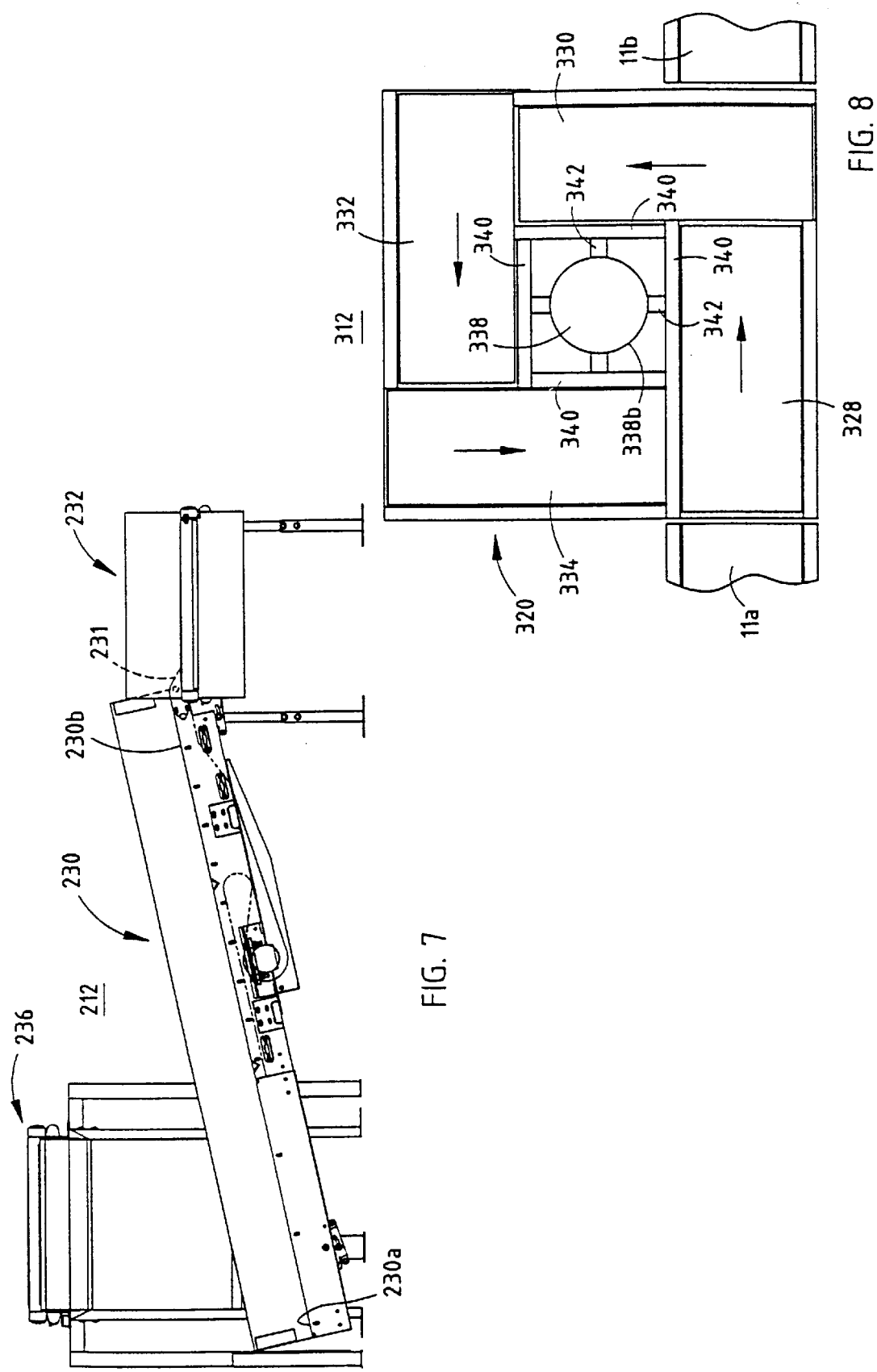

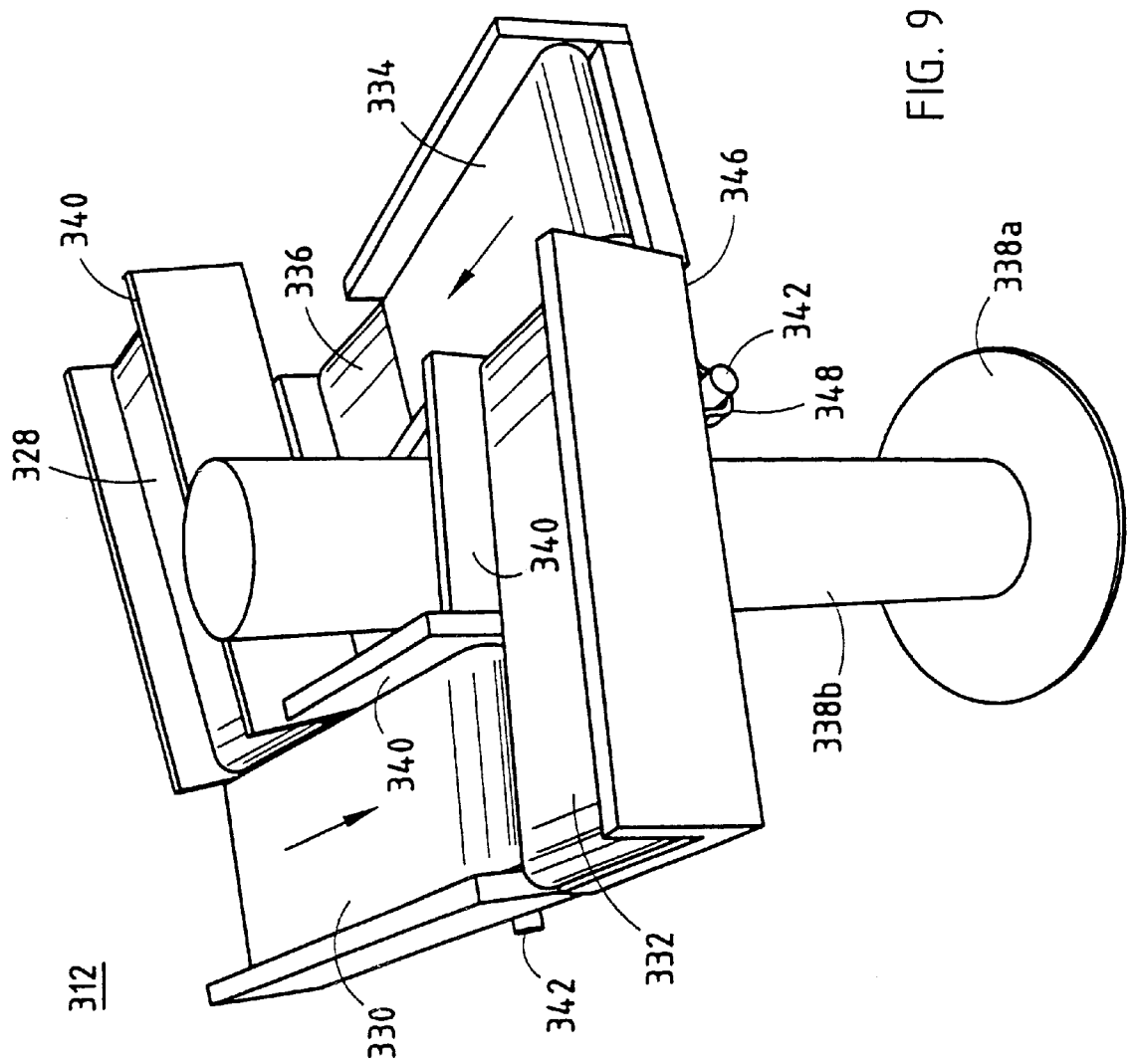

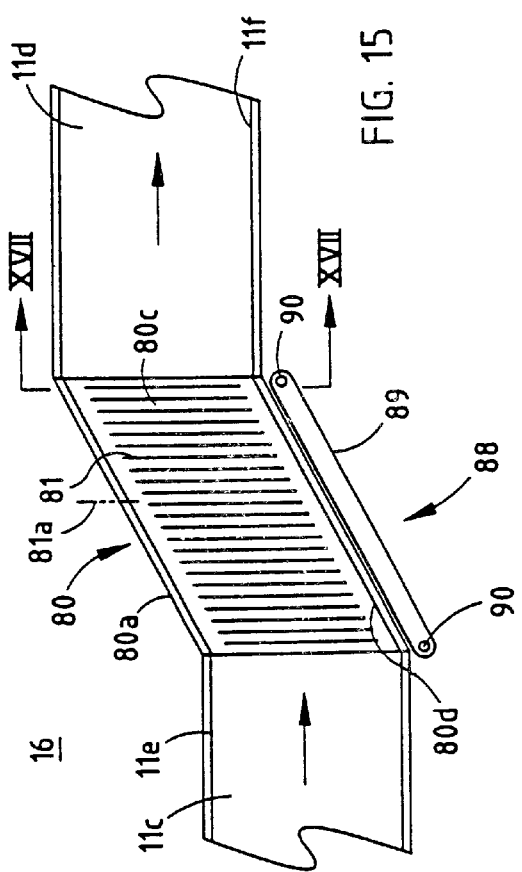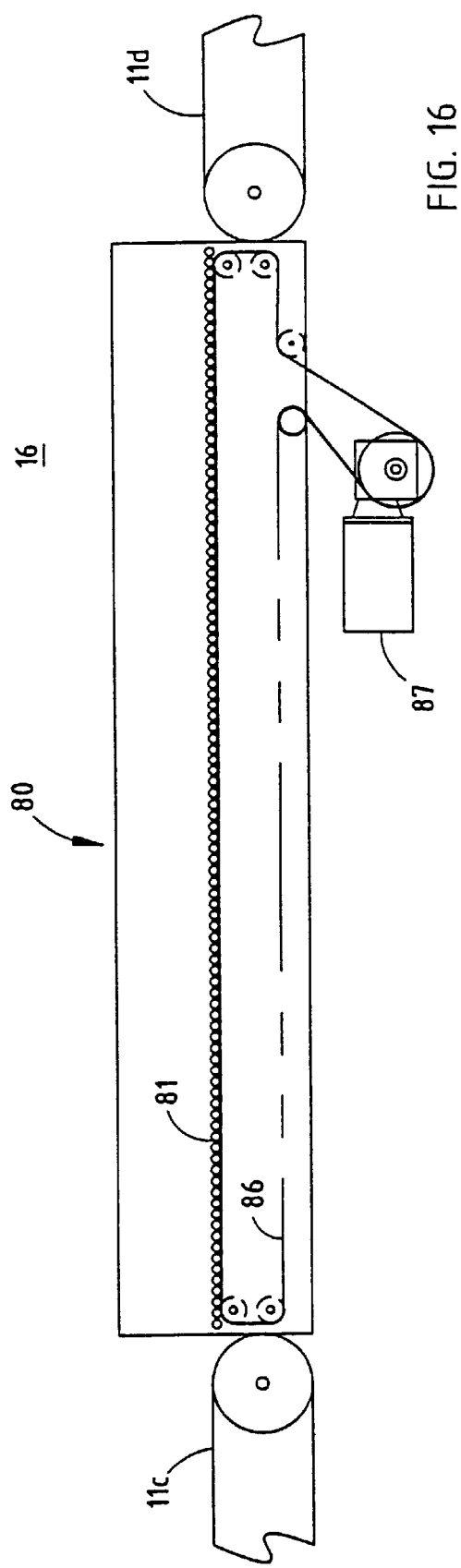

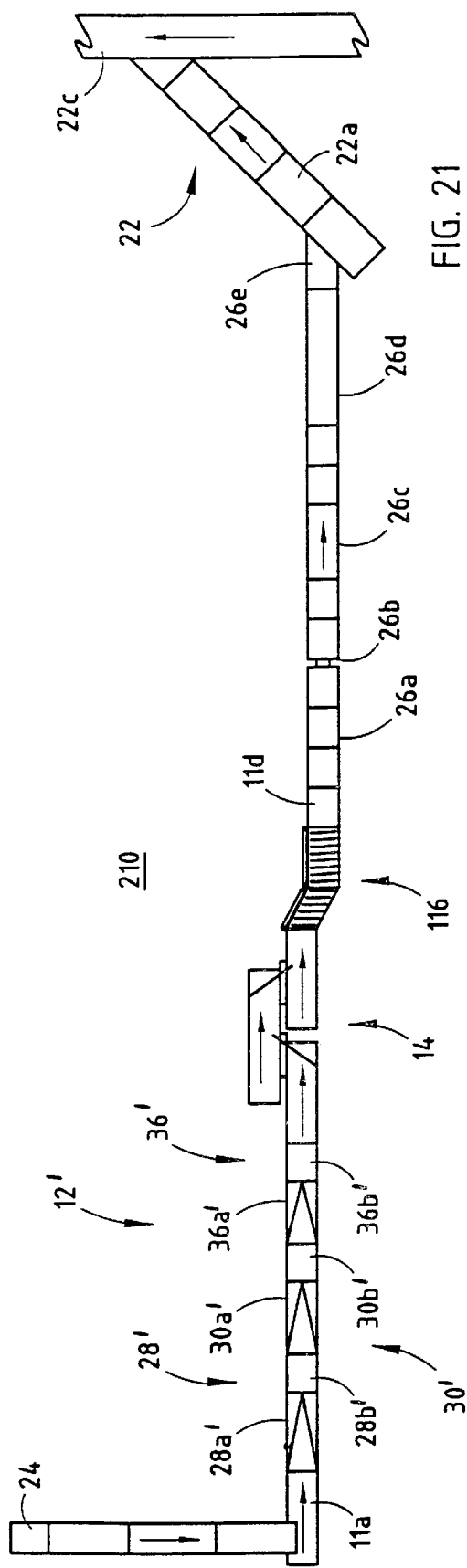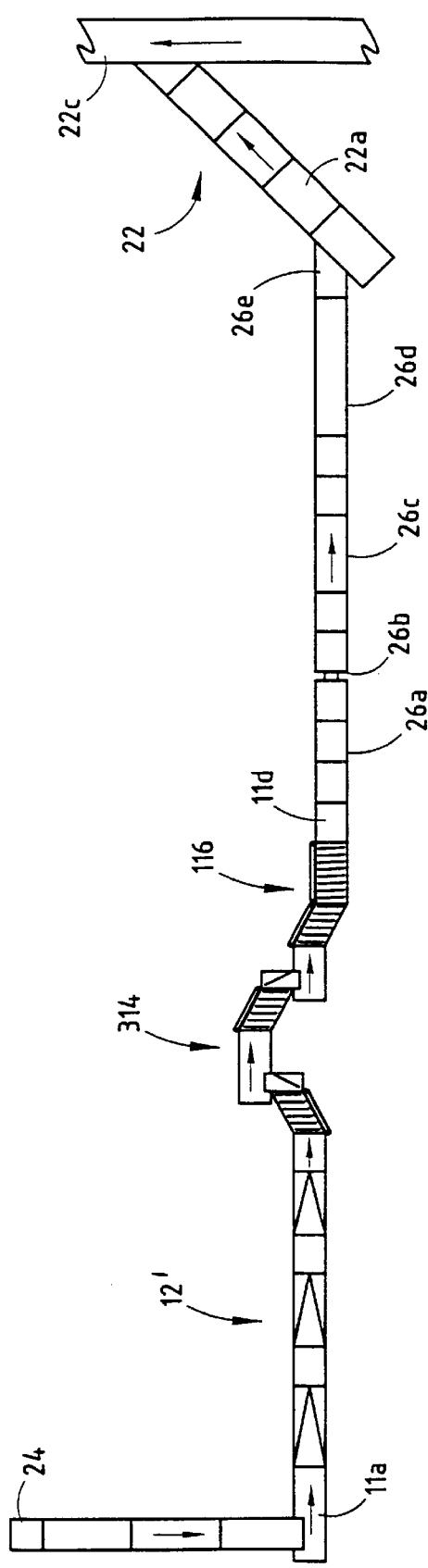
FIG. 21
FIG. 22

ARTICLE SEPARATION CONVEYOR

CROSS REFERENCE TO RELATED APPLICATIONS

This application claims priority on U.S. Provisional applications, Ser. No. 60/200,043, filed Apr. 27, 2000, Ser. No. 60/251,685, filed Dec. 5, 2000, and Ser. No. 60/272,649, filed Mar. 1, 2001, which are hereby incorporated herein by reference.

FIELD OF THE INVENTION

This invention relates generally to conveyor systems for conveying articles and, more particularly, to a separation conveyor system which de-stacks, aligns and compresses random clusters of articles into a generally single file arrangement. The present invention also relates generally to article side by side eliminators or singulators for conveyors, which function to separate articles traveling side by side along the conveyor and orient the articles in a singular, in line manner. More particularly, the present invention relates to a conveyor system having one or more article singulators, destackers and/or aligners, which are operable to unstack articles which are stacked upon one another as they are conveyed, and to align and arrange the articles along one side of the conveyor as they are discharged from the system. The article separation system is operable to continuously move the articles along the conveyor while arranging the articles in the unstacked, singular and in line manner.

BACKGROUND OF THE INVENTION

Many conveyor operations, especially those used in the processing of mail, receive a variety of articles varying in height, length and depth. Normally, these articles are received in a random fashion, and are often "dumped" or placed onto an input conveyor such that the articles are piled one upon another in a non-symmetrical, vertical orientation. Once the articles are positioned on the input conveyor, they are transported downstream to a scanning area or station wherein information contained on an exterior surface of the articles is scanned by one of a variety of scanning devices normally employed in the art, such as, for example, an optical character recognition system, a bar code reading system, or a video code system. Prior to introduction to the scanning station, the articles must be rearranged to eliminate the vertical stacking, and to assume a single file with a generally uniform distance or gap between adjacent articles. Failure to effectively separate the articles along the conveyor system prior to the scanning procedure prevents the scanner from receiving data from each article necessary to properly sort and divert the articles during downstream processing. If the articles are not effectively identified, errors occur in the sortation and diversion process, which in turn reduces the throughput or efficiency of the conveyor and sortation system.

The industry has addressed the need to separate and singulate articles by providing a variety of unscrambling or singulation conveyors, which are operable to separate articles from one another as they travel along the conveyor. Many conveyors include devices which function to ensure that the articles arriving at the discharge end of the conveyor are arranged in a non-stacked manner, while other devices are provided to align the articles. This substantially eases the unloading and/or sorting process at the discharge end of the conveyor. However, many of these singulation conveyors are complex in structure and operation, thereby increasing both manufacturing and maintenance costs of the conveyor system.

Furthermore, if a conventional singulation conveyor experiences a high volume of articles in a short period of time, a bottleneck may form, whereby the singulation conveyor may be incapable of handling the temporary increase in article quantity. As a result, either the conveyor line is temporarily shut down until the surge in article flow passes, or the singulation conveyor inadequately singulates the articles. The inability of the singulation conveyor to handle sudden increases in article quantity reduces the efficiency of the conveyor system.

Additionally, other devices for separating articles are known and function to separate side by side articles and arrange them on a conveyor in a generally in line orientation. However, many such devices are complicated and expensive devices. For example, one such device comprises a plurality of side by side thin belts which are separated by blocks or surfaces which may be raised above the belts. The device includes a camera or sensor which detects when two articles are traveling side by side along the conveyor. The blocks are then raised on one side of the device to temporarily stop movement of one of the articles, while the other article proceeds along the device via movement of the thin belts. After a sufficient gap separates the two articles, the blocks are lowered so the thin belts again move the article along the conveyor, but at a distance behind the other article. Not only are such devices expensive, but they also reduce the throughput of the conveyor, since they stop one of the articles for a period of time to allow the other article to proceed ahead.

Typically, in order to align the articles on the conveyor, such as along one side of the conveyor, an alignment section may be provided to move the articles toward one side of the conveyor. The alignment section may comprise a plurality of rollers which are angled or skewed across the conveyor section, such that the rollers move the article downstream and toward one side of the conveyor section. However, in order to provide a generally continuous conveying surface from an input conveyor onto the alignment conveyor, the rollers at each end of such alignment conveyors must be progressively shorter toward the ends to accommodate the angle or skew of the rollers relative to the parallel sidewalls of the conveying portion. Having rollers of non-uniform length at the ends is undesirable, since this results in gaps between the ends of the shorter rollers and the feed or discharge conveyor, which may further result in articles becoming lodged or stuck in the gaps as the articles are moved onto or off from the alignment section of the conveyor.

Therefore, there exists a need for an article separation conveyor system capable of effectively separating, de-stacking and/or aligning articles. The conveyor system should be economical to manufacture and maintain.

SUMMARY OF THE INVENTION

The present invention provides a separation conveyor system having a destacking conveying apparatus, a separating or singulating conveying apparatus and/or an aligning apparatus. Articles which are input onto the conveyor system in a random manner are discharged therefrom in a generally single file, aligned manner. The separation conveyor system of the present invention provides a unique and effective method of separating articles prior to their conveyance to a scanning device which identifies the articles for induction into a sortation system.

According to an aspect of the present invention, an aligning apparatus includes an angled conveyor section, a vertically oriented conveyor along a downstream side of the conveyor section, and aligning means for aligning articles such that they are discharged in a generally in line manner onto an output conveyor. The angled conveyor section is positioned between a discharge end of an input conveyor and an input end of the output conveyor, which is laterally offset from the input conveyor. The angled conveyor section is operable to convey articles from the input conveyor generally toward the downstream side of the angled conveyor section and onto the output conveyor. As the articles are conveyed along the angled conveyor section, the articles are directed toward the vertical conveyor belt, which guides the articles therealong, whereby they are discharged in a substantially linear, aligned manner onto the output conveyor. The vertical conveyor preferably includes a vertically oriented conveying belt which is positioned such that a lower edge of the belt is below a conveying surface defined by the angled conveyor section. The vertical conveyor functions to maintain the articles along the side of the conveying portion, while being further operable to slow the movement of the articles, in order to enhance separation and alignment of the articles.

In one form, the aligning means is an arcuate section of the angled conveyor and/or an arcuate section of the vertical conveyor. In another form, the aligning means is a second conveyor having skewed rollers and a second vertically oriented conveyor.

According to another aspect of the present invention, a side by side eliminating conveyor or article singulator is positioned along at least one conveying surface and includes at least one generally rigid redirecting member. The article singulator is operable to arrange articles in a generally in line and unstacked manner while the conveying surface is continuously operable to continuously convey the articles therealong.

In one form, the side by side eliminating conveyor includes at least one, and preferably two, redirecting members which function to redirect the articles as the articles are continuously conveyed along the conveying surface. The side by side eliminator or singulator preferably includes a pair of redirecting members at opposite sides of the conveying surface, with one being positioned downstream from the other, such that the articles are sequentially redirected by both of the redirecting members as they are conveyed along the conveying surface. The conveying surface may further comprise two or three conveying surfaces, such that the articles are redirected from one surface onto another surface, which may be operable at a different speed from the first conveying surface.

According to yet another aspect of the present invention, a destacking conveying apparatus includes an input conveyor, a first conveyor operated at a first speed, a second conveyor operated at a second speed, and an output conveyor generally aligned with a direction of conveyance of the input conveyor. At least a portion of the first conveyor is inclined and has an output end, while at least a portion of the second conveyor is inclined and has an input end proximate to and at a height at least partially below a height of the output end of the first conveyor. The first and second conveyors are continuously operable to convey articles along the article destacking conveyor, with the second speed being greater than said first speed. The conveyors of said article destacking conveyor are configured to form a loop between the input and output conveyors.

The conveyors are operated at sequentially higher speeds to destack and thereby create a distance or gap between articles transferred from an output end of one conveyor and onto the next successive conveyor. Articles transferred from one conveyor to the next are progressively separated with the gap between adjacent articles increasing as the articles move between conveyors. As many article separation conveyors as are necessary to effectively separate articles may be placed in a single conveyor line.

Another aspect of the present invention provides an article separation conveyor system which combines a destacking apparatus, a side by side eliminating apparatus and an aligning apparatus in an article separating conveyor system. The article separation conveyor system is operable to separate and align articles as they are continuously conveyed therealong. The destacking conveyor includes first and second inclined conveying portions which are continuously operable to convey articles upward and drop the articles onto an adjacent downstream conveying portion. The side by side eliminating conveyor includes a third conveying portion and at least one generally rigid diverting member extending at least partially across the third conveying portion. The side by side eliminating conveyor is operable to arrange articles in a generally in line and unstacked manner while the third conveying portion is continuously operable to convey the articles therealong. The aligning conveyor includes an angled conveyor section positioned between a discharge end of an input conveyor and an input end of an output conveyor. The output conveyor is laterally offset from the input conveyor and downstream from the roller conveyor. The angled conveyor has a downstream side and is operable to convey articles from the input conveyor generally toward the downstream side and onto the output conveyor. The aligning conveyor includes a vertically oriented conveyor positioned along the downstream side of the angled conveyor. The article separation conveyor is operable to continuously convey articles along the destacking conveyor, the side by side eliminating conveyor and the aligning conveyor to separate, destack and align the articles such that the articles are discharged in a generally separated and inline manner on the output conveyor. The discharge conveyor section may include gap setting portions, scanning devices and/or the like to orient and identify the articles as they are conveyed downstream toward and onto an induction station of a sortation system.

According to yet another aspect of the present invention, a method for separating and aligning articles as they are conveyed along a conveyor comprises separating and destacking articles by conveying the articles along at least two inclined conveyors which convey the articles up along inclined conveying surfaces and drop the articles onto an adjacent downstream conveyor. The method further includes eliminating side by side positioning of articles by redirecting articles from one side of a conveyor to the other via at least one rigid diverting member. The method further includes aligning articles in a generally in line manner by conveying articles along an angled conveyor positioned between two laterally offset conveyor sections. The angled conveyor preferably includes rollers which are rotatable about axes generally normal to a direction of conveyance of the two laterally offset conveyor sections and operable to convey articles downstream toward a downstream side of the angled conveyor. The method further includes discharging the articles onto a downstream one of the two laterally offset conveyor sections.

Accordingly, the conveyor system of the present invention is operable to de-stack and separate articles as they are conveyed through the destacking apparatus and/or the side by side eliminating apparatus, and then is further operable to align and arrange the articles in a desired manner via the aligning apparatus for scanning at a downstream conveying portion. The destacking apparatus and side by side eliminating apparatus may be positioned upstream or downstream from one another, and preferably upstream of the aligning apparatus. The conveying system may be operable with one or more of the separating and aligning devices, depending on the application. Each device or apparatus may be operable in a conveying system independent of the other conveying devices.

These and other objects, advantages, purposes and features of the invention will become apparent upon review of the following specification in conjunction with the drawings.

BRIEF DESCRIPTION OF THE DRAWINGS

FIGS. 3A–3D are side elevations of the side sections of the destacking conveyor of FIG. 2;

FIG. 7 is a side elevation of the destacking conveyor of FIG. 6;

FIG. 8 is a top plan view of yet another embodiment of a destacking conveyor in accordance with the present invention;

FIG. 9 is a perspective view of the destacking conveyor of FIG. 8;

FIG. 15 is a top plan view of an aligning conveyor in accordance with the present invention;

FIG. 16 is a side elevation of the aligning conveyor of FIG. 15;

FIG. 21 is a top plan view of another embodiment of a conveyor system in accordance with the present invention; and FIG. 22 is a top plan view of yet another embodiment of a conveyor system in accordance with the present invention.

DESCRIPTION OF THE PREFERRED EMBODIMENTS

Figure 1:
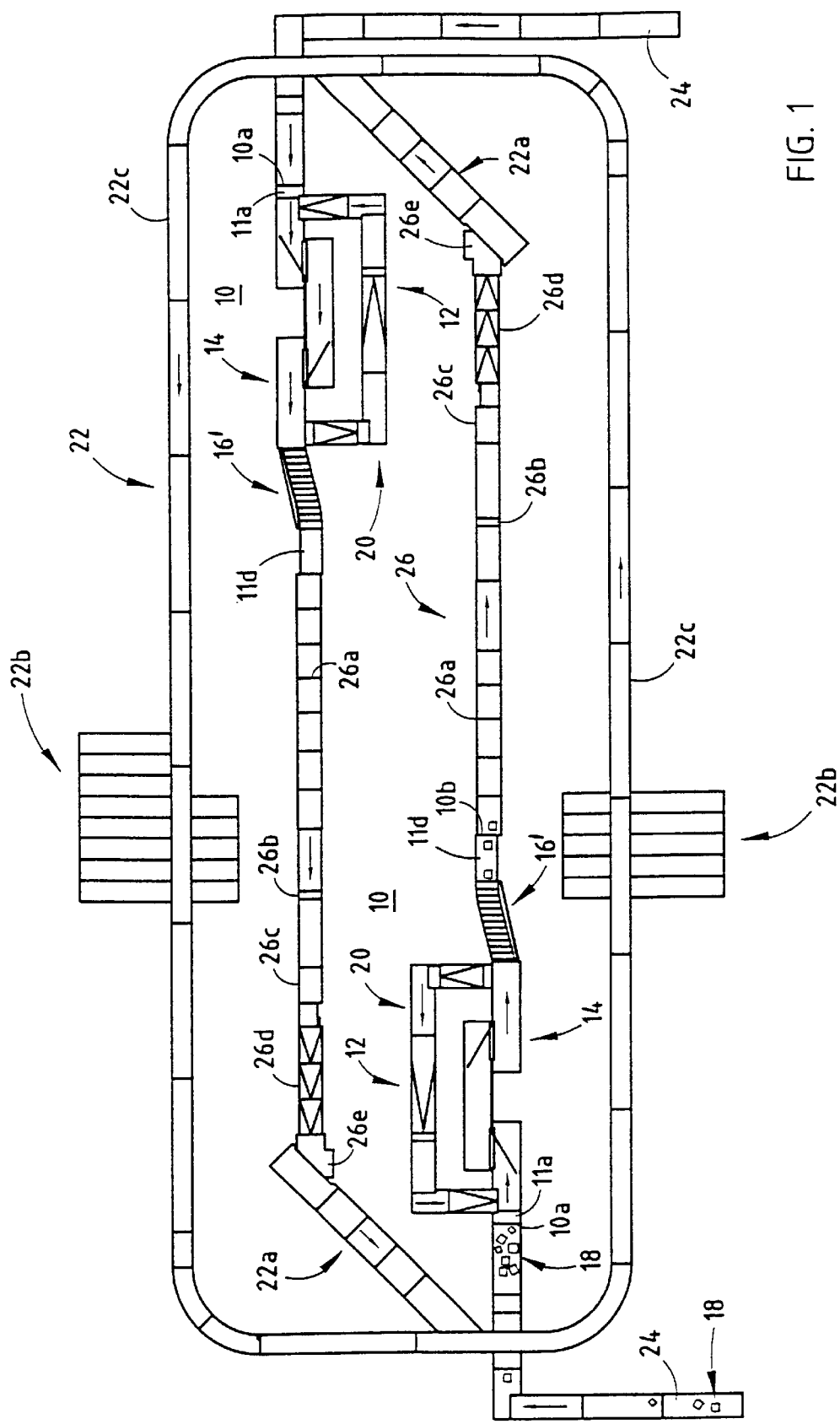
FIG. 1 is a top plan view of a conveyor system according to the present invention, as implemented at a sortation system.

Referring now specifically to the drawings and the illustrative embodiments depicted therein, an article separation conveyor system 10 includes a de-stacking conveyor or conveying device or apparatus 12, a side by side eliminating conveyor or conveying device or apparatus 14 and an aligning conveyor or conveying device or apparatus 16' (FIG. 1). Articles 18 are input at an input end 10a of conveyor system 10 in random fashion, and may be positioned side by side or on top of one another as they travel along an input conveying portion 11a at input end 10a of conveyor system 10. In the illustrated embodiment, articles 18 are conveyed by input conveying portion 11a to the de-stacking conveyor 12, where the articles are conveyed along a plurality of conveying portions 20, which function to de-stack and separate the articles from one another, as discussed below. The articles may be discharged onto a take-away conveyor 11b (FIG. 3A), which conveys the articles to side by side eliminating conveyor 14, or may be discharged directly onto side by side eliminating conveyor 14, (as shown in FIG. 1). The articles are conveyed along side by side eliminating conveyor 14 and are further de-stacked and separated before the articles are discharged onto a second take-away conveying portion 11c (FIGS. 13 and 14) or directly onto aligning conveyor 16', as shown in FIG. 1 and discussed below. Aligning conveyor 16' is operable to align the articles along one side of aligning conveyor 16', such that the articles are discharged along one side of a third take-away conveyor 11d, which functions to convey the articles in a generally aligned and arranged manner downstream from aligning conveyor 16'. Conveyor system 10 is thus continuously operable to de-stack and separate articles as they are conveyed therealong, and is further operable to substantially align the articles as they exit the system, thereby enhancing the throughput of the conveying system.

Conveying system 10 may include de-stacking conveyor 12, side by side eliminating conveyor 14 and aligning conveyor 16', which may be arranged in-line with one another between input 10a and discharge end 10b of conveying system 10 (FIG. 1). However, each of the conveying devices 12, 14, 16' may be applied to a conveyor system independently from the other conveying devices, or may be applied in various combinations with one or both of the other conveying devices, without affecting the scope of the present invention. For example, de-stacking conveyor 12 may be implemented independently of the other conveying devices 14 and 16' of conveyor system 10, or side by side eliminating conveyor 14 may be implemented independently of de-stacking conveyor 12 and/or aligning conveyor 16'. Clearly, other combinations of the conveying devices 12, 14 and 16' of the present invention may be implemented in various conveyor systems, depending on the application and desired result of the system, without affecting the scope of the present invention.

As shown in FIG. 1, conveyor system 10 is applicable at a sortation system 22, which is operable to receive individual articles at induction stations 22a and to sort the articles to appropriate discharge chutes or destination stations 22b positioned around a continuous conveying path or loop 22c. The sortation system 22 may be any known sortation system, or may be of the type disclosed in commonly assigned U.S. Pat. No. 5,588,520, or as disclosed in commonly assigned, co-pending U.S. Pat application Ser. No. 09/675,237, filed Sept. 29, 2000 by Edwards et al., now U.S. Pat. No. 6,478,138, the disclosures of which are hereby incorporated herein by reference. The induction stations 22a are operable to induct articles onto transport units (not shown) which travel around the continuous conveying path 22c and function to discharge the articles at the appropriate discharge chute 22b. The induction station 22a may be any known type, or may be of the type disclosed in commonly assigned U.S. Pat. application Ser. No. 09/669,170, filed Sep. 25, 2000 by Affaticati et al. for HIGH RATE INDUCTION SYSTEM, now U.S. Pat. No. 6,513,641, the disclosure of which is hereby incorporated herein by reference. The transport units may be conventional tilt trays or cross-belt units, or may be transport units of the type disclosed in U.S. Pat. No. 5,588,520, or in U.S. Pat. application Ser. No. 09/675,237, filed Sep. 29, 2000 by Stuart M. Edwards et al., for DOUBLE WIDTH CROSSBELT SORTER (Attorney Docket RAP04 P-611), now U.S. Pat. No. 6,478,138, the disclosures of which are hereby incorporated herein by reference.

Figure 20:
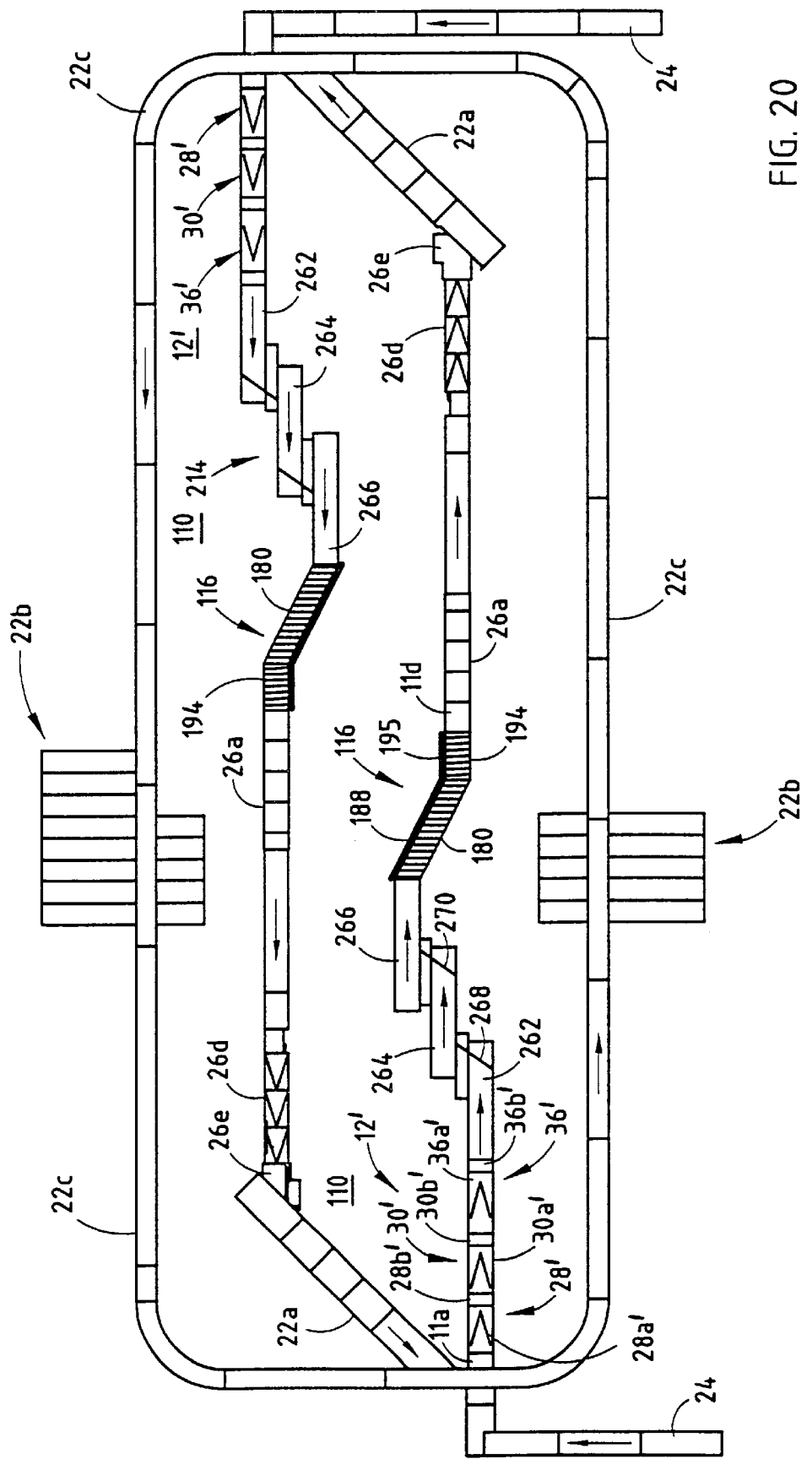
FIG. 20 is a top plan view of an alternate embodiment of a conveyor system in accordance with the present invention, as implemented at a sortation system.

During operation of conveyor system 10 and sortation system 22, articles 18, such as boxes, packages, bags or the like, are loaded onto an input conveyor 24, which is operable to convey the articles, which may be piled on top of one another and/or side by side one another in a random manner, to infeed conveyor 11a at input end 10a of conveyor system 10. After conveyor system 10 has substantially de-stacked and aligned the articles, as discussed in detail below, the articles are discharged via take-away conveyor lid at discharge end 10b of conveyor system 10 onto one or more conveying sections 26, which convey the separated and aligned articles toward and onto the respective induction station 22a. In the illustrated embodiment of FIG. 1, conveying sections 26 includes a four belt gap setter or gapper 26a, which includes four belts (but may include more or less belts, depending on the application) which are operable at variable speeds to space the articles evenly along the belts as they are conveyed toward the induction station 22a. Such gap setting systems are known and may further include a photo eye or sensor (not shown) which detects the gap between consecutive articles and adjusts the speed of the belts to move the articles relative to one another to separate them by a preferred gap distance. The gapper may be of the type which is commercially available and marketed by SORTEC, or may be any other known gapper or gap setting device, without affecting the scope of the present invention. Conveying sections 26 may further include a pair of camera belts 26b downstream from gapper 26a. The camera belts 26b include a scanner positioned therebetween which is operable to identify the articles via scanning of a barcode or the like, prior to conveying the articles toward the induction station 22a. Following identification of the articles, the articles may be weighed on a scale belt 26c to determine the weight of the package prior to the sortation process. An inclined belt or belts 26d may then convey the articles upward onto an orientation belt 26e, which rotates the articles to align the articles with the angle of the induction station 22a. Induction station 22a then inducts the articles onto an appropriate transport unit moving along conveying path 22c, as disclosed in U.S. Pat. No. 5,588,520 or U.S. Pat. application Ser. No. 09/669,170, now U.S. Pat. No. 6,513,641. Because the articles are input at input conveyor 11a in a random manner, conveyor system 10 functions to de-stack and align the articles, as discussed below, to enhance the identification and orientation processes prior to induction onto the transport units of the sortation system. This substantially reduces bottlenecks and improves throughput of the sortation system. As shown in FIGS. 1 and 20, two conveyor systems may be implemented to destack and align articles between respective input conveyors and induction stations of a closed loop sortation system.

Referring now to FIGS. 2 and 3A–D, article de-stacking conveyor 12 includes an input conveyor portion or section 28 which receives articles 18 from conveying portion or infeed conveyor 11a (FIG. 3A). Articles 18 are normally received by input conveyor section 28 in a cluster arrangement, with articles 18 varying in height, length and depth. The random arrangement of articles 18 includes a plurality of articles that may be stacked atop one another in a random, vertical arrangement. Article separation conveyor 12 separates articles 18 traveling along conveying portions 20 and orients the articles in a primarily single file arrangement with a separation distance, or gap, between adjacent articles 18. The articles are then discharged onto takeaway conveyor 11b or directly onto side by side eliminating conveyor 14, as discussed below.

Figure 2:
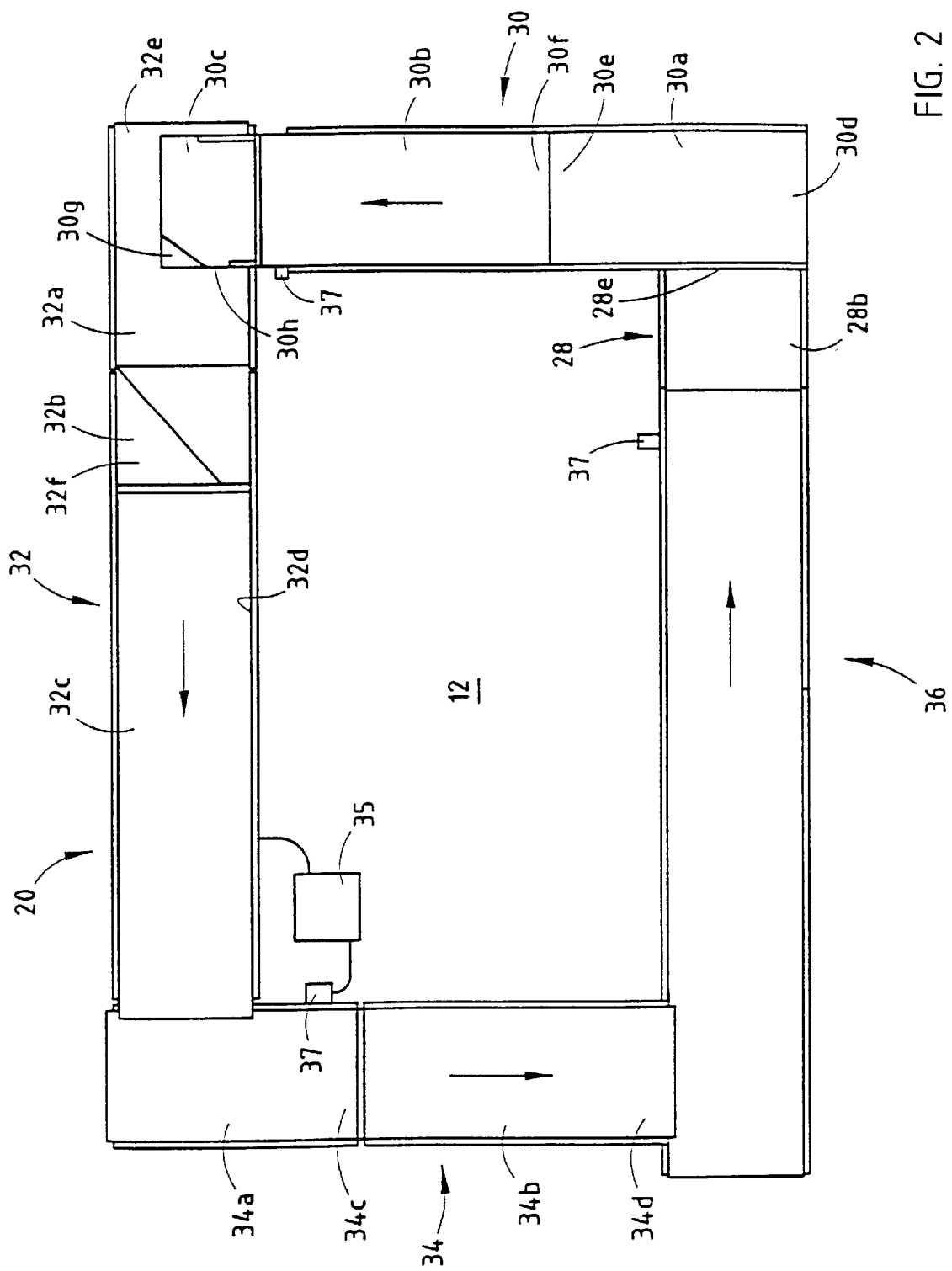
FIG. 2 is a top plan view of a destacking conveyor in accordance with the present invention.

Conveying portions 20 include inlet conveying portion 28 (FIG. 3A), which is operable to convey articles from input conveyor 11a onto a first of three at least partially inclined intermediate conveying sections 30 (FIG. 3B), 32 (FIG. 3C), and 34 (FIG. 3D), which further convey the articles upward onto an upper discharge conveying portion 36, and then onto take-away conveyor 11b. As shown in FIG. 2, each of the conveying portions 28, 30, 32, 34 and 36 are arranged generally orthogonal to one another, such that the articles are conveyed in the generally spiraling upward manner. Preferably, the speed of each subsequent or downstream conveyor of conveying portions 20 is greater than the speed of the previous adjacent or upstream conveyor to enhance the destacking and separation of the articles. Each conveyor of conveying portions 20 of destacking conveyor 12 preferably include belt conveyors having a continuous conveying belt driven and routed around rollers at each end of the conveyor, as is known in the art.

Input conveying portion 28 and intermediate conveying portions 30, 32 and 34 include inclined conveyors for conveying articles upward and along the conveying portions, whereby the discharge end of each inclined conveyor is at a height above an input end of each adjacent downstream conveying portion, such that articles are dropped off of the discharge end of the inclined conveying portions onto the input end the next adjacent conveying portion. As shown in FIGS. 3A, 3B, 3C and 3D, each conveying portion 28, 30, 32, 34 and 36 includes different conveyors and/or chutes, which function to convey and destack articles as they are conveyed around the loop of destacking conveyor 12. More particularly, as shown in FIG. 3A, input conveyor section 28 includes a first inclined conveyor 28a and a second inclined conveyor 28b, with an input end 28c of the second inclined conveyor 28b being at a height below an output or discharge end 28d of the first inclined conveyor 28a. Likewise, a discharge end 28e of the second inclined conveyor 28b is at a height greater than an input end 30d of the next adjacent or downstream conveying section 30. Preferably, the second conveyor 28b is operable at a higher rate of speed than the first conveyor 28a.

As shown in FIG. 3B, conveying portion 30 includes a generally horizontal input conveyor 30a, an inclined conveyor 30b and a chute 30c. Input end 30d of horizontal conveyor 30a receives articles from discharge end 28e of the second inclined conveyor 28b of conveying portion 28 and conveys the articles in a direction generally normal to the direction of conveyance along conveying portion 28. A discharge end 30e of horizontal conveying portion 30a discharges articles onto an input end 30f of inclined conveyor 30b, which further conveys articles upward along the incline slope to chute 30c. Articles 18 are discharged from inclined conveyor 30b and onto chute 30c, which further directs or guides the articles downward and onto an input end 32e of conveying section 32 along the next side of destacking conveyor 12. Chute 30c is inclined generally downward to guide the articles downward onto the next conveying section, and may include a downward turned portion 30g along a laterally inward side 30b (FIGS. 2 and 3C) to cause the articles to be directed downward and inward or toward the left hand side of chute 30c, with reference to FIG. 2. In the illustrated embodiment, similar to conveyors 28a and 28b, the speed of inclined conveyor 30b is preferably greater than the speed of horizontal conveyor 30a, which may also be greater than the speed of second inclined conveyor 28b of conveying section 28, in order to further enhance the separation function of the conveyor portions as articles are conveyed therealong.

As shown in FIGS. 2 and 3C, conveying section 32 is positioned orthogonal to upstream conveying portion 30 and includes an input conveyor 32a, a steering chute 32b and an inclined conveyor 32c. In the illustrated embodiment, input conveyor 32a is positioned at a downward incline or angle to convey articles received from chute 30c of conveying portion 30 in a direction generally orthogonal to the direction of conveyance along conveying portion 30 and downwardly into steering chute 32b. Steering chute 32b includes an upward turned portion 32f along the laterally outward side and guides and redirects the articles downward and laterally inward toward an inner wall 32d of inclined conveyor 32c, whereby the articles are conveyed upward along inclined conveyor 32c and onto the next adjacent or downstream conveying portion 34. Preferably, the speed of inclined conveyor 32c is greater than the speed of conveyor 32a, which may also be greater than the speed of inclined conveyor 30b of upstream conveying portion 30.

Referring now to FIGS. 2 and 3D, conveying portion 34 is positioned generally orthogonal to conveying portion 32 and includes a pair of oppositely inclined conveyors 34a, 34b. The first inclined conveyor 34a is downwardly inclined to convey articles from inclined conveyor 32c in a direction generally normal to the direction of conveyance along conveying portion 32 and downward with respect thereto. Conversely, second inclined conveyor 34b is inclined upwardly to convey articles from a lower, discharge end 34c of first inclined conveyor 34a upward to an upper discharge end 34d of the second inclined conveyor 34b and onto discharge conveying portion 36. Similar to the other conveying portions, the second inclined conveyor 34b may be operable at a speed greater than the first inclined conveying portion 34a, which may also be further operable at a speed greater than inclined conveyor 32c of upstream conveying section 32.

As shown in FIGS. 2 and 3A, discharge conveying portion 36 receives articles from the discharge end 34d of inclined conveyor 34b and conveys the articles generally horizontally to take-away conveyor 11b (FIG. 3A), which further conveys the articles downstream toward the side by side eliminator 14, the aligner 16, conveying sections 26 and/or the induction station 22a of the sortation system 22. Similar to conveying portions 28, 30, 32 and 34, discharge conveyor 36 may be operable at a higher rate of speed than the immediately upstream conveyor, such as second inclined conveyor 34b, to enhance separation of the articles. As shown in FIG. 1, discharge conveying portion 36 and/or take-away conveyor 11b may be replaced by side-by-side eliminating conveyor 14, in order to further compress the conveyor system 10 of the present invention, depending on the application and floor space available for the conveyor system.

As can be seen in FIGS. 3B, 3C, and 3D, the angle of incline of the upwardly inclined conveyors 30b, 32c and 34b may be selected to progressively decrease with each downstream conveying section. For example, the angle of incline of the first upwardly inclined conveyor 30b is approximately 30 degrees in the illustrated embodiment, while the angle of incline of inclined conveyor 32c is less than the angle of incline of inclined conveyor 30b, such as approximately 20 degrees, and the angle of incline of inclined conveyor 34b is less than the angle of incline of inclined conveyor 32c, such as approximately 15 degrees. The angles may be progressively smaller with respect to horizontal since most of the destacking will be accomplished in the first conveying portions, such that the later conveying portions need not be as aggressive. However, the angles of the inclined portions may be selected to be other degrees of incline, without affecting the scope of the present invention.

Destacking conveyor 12 is thus operable to convey articles in a generally circular path or loop while conveying the articles upward to an upper level of conveying sections, while further functioning to substantially de-stack and separate the articles from one another as they are conveyed therealong. As the articles are conveyed and dropped by the various conveyors and chutes, the articles are separated from one another such that the articles are substantially destacked and separated by the time they are discharged onto takeaway conveyor 11b. Optionally, one or more sensors or photo eyes 37 (FIG. 2) may be positioned along conveying portions 20 to determine the amount of gap or separation distance between articles conveyed therealong. A control 35 may be included to adjust the speed of conveying portions 20 in response to the gap detected, in order to speed up or slow down conveying portions 20 to increase or decrease the gap to a desired amount. The speed adjustment may be selectively applied to one or more particular, selected conveyors, such as the conveyors at which the inappropriate gap is detected, or the speed adjustment may be applied to all of the conveyors of the destacker. The conveyance speed may be adjusted by a selected amount or may be proportionately adjusted depending on the amount of gap detected. It is further envisioned that the conveyance speed of all of the conveyors may be correspondingly adjusted to maintain the speed of each conveyor in proportion to the other conveyors. For example, if an upstream conveyor is operable at approximately 50% of the speed of an adjacent downstream conveyor, the conveyance speed may be adjusted up or down such that the upstream conveyor remains operable at approximately 50% of the speed of the adjacent downstream conveyor after the speed adjustment. The control may continuously adjust the conveyance speeds in this manner in response to changes in the separation or gap distance detected between the articles being conveyed along the destacking conveyor.

In the illustrated embodiment of FIGS. 2 and 3A–D, the conveying portions 28, 30, 32, 34 and 36 are arranged generally orthogonal to one another, thereby defining a generally upward spiraling conveying path or conveyor 20. However, aspects of destacker 12 may be equally applicable to conveying portions which are generally aligned with one another, as shown in FIGS. 20–22, without affecting the scope of the present invention. For example, an aligning conveyor 12' may include conveying portions 28', 30', and 36', which are configured to be generally aligned with one another and further aligned with the input conveyor 11a and take-away conveyor 11b. With reference to FIG. 21, input conveying portion 28' includes a first inclined conveyor 28a' and a steering chute 28b' positioned at a downstream end of inclined conveyor 28a'. Inclined conveyor 28a' receives articles from input conveyor 11a, conveys the articles upward and along its inclined conveying surface and discharges the articles into the steering chute 28b'. Steering chute 28b' guides the articles downward and toward one side 28c' of steering chute 28b', such that the articles are discharged from steering chute 28b' generally along one side of the next adjacent or downstream conveying portion 30'.

The second or intermediate conveyor portion 30' of aligning conveyor 12' likewise includes a first inclined conveying portion 30a' and a steering chute 30b' positioned immediately downstream from the inclined conveyor 30a'. Inclined conveyor 30a' receives the articles from chute 28b' of conveyor portion 28' and conveys the articles upward and along the inclined conveying surface of inclined conveyor 30a' and discharges the articles onto steering chute 30b', whereby the articles are guided downward and generally toward one side of conveying portion 30' and eventually discharged onto conveying portion 36'.

Conveying portion 36' includes an inclined conveyor 36a' and a transition plate or nose over plate 36b' positioned downstream from inclined conveyor 36a'. Inclined conveyor 36a' receives articles from steering chute 30b' and conveys the articles upward and along the conveying surface toward an adjacent downstream conveyor, such as side by side eliminating conveyor 14 (FIG. 21) or toward a take-away conveyor or the like. Transition plate 36b' bridges the gap between a discharge end of inclined conveyor 36a' and the input end of the next adjacent downstream conveying portion. This provides a smooth transition from inclined conveyor 36a' onto the downstream conveyor and further prevents articles from falling between conveyor 36a' and the downstream conveyor or becoming lodged therebetween.

Inclined conveyors 28a', 30a' and 36a' and steering chutes 28b' and 30b' are substantially similar in construction and operation as the inclined conveyors and steering chutes of de-stacking conveyor 12, discussed above, such that a detailed description will not be repeated herein. Similar to destacking conveyor 12, discussed above, each inclined conveyor 28a', 30a', 36a' may be operable at a greater rate of speed than the speed of the previous or upstream conveyor to further enhance separation and de-stacking of the articles as they are conveyed along destacking conveyor 12'. However, the speed of the conveyor belts may be otherwise selected depending on the application and desired result, without affecting the scope of the present invention. Also, similar to destacker 12, the speed of the conveyors may be selectively adjustable in response to one or more gap detectors (not shown in FIGS. 20–22). Likewise, it is further envisioned that the angle of incline of each inclined conveyor 28a', 30a', 36a' may be selected such that the angle of incline progressively decreases from each inclined conveyor to the next downstream conveyor. For example, input inclined conveyor 28a' may be inclined at an angle of approximately 30 degrees above horizontal, while intermediate inclined conveyor 30a' may be inclined at an angle of approximately 20–25 degrees and discharge inclined conveyor 36a' may be inclined at an angle of approximately 15 degrees. Therefore, the destacking conveying portions of the destacking conveyor of the present invention may be arranged in an aligned manner or in a loop or even partial loop. The arrangement of the conveying portions of the destacking conveyor may be selected depending on the floor space and application of the conveyor system of the present invention.

Figure 4:
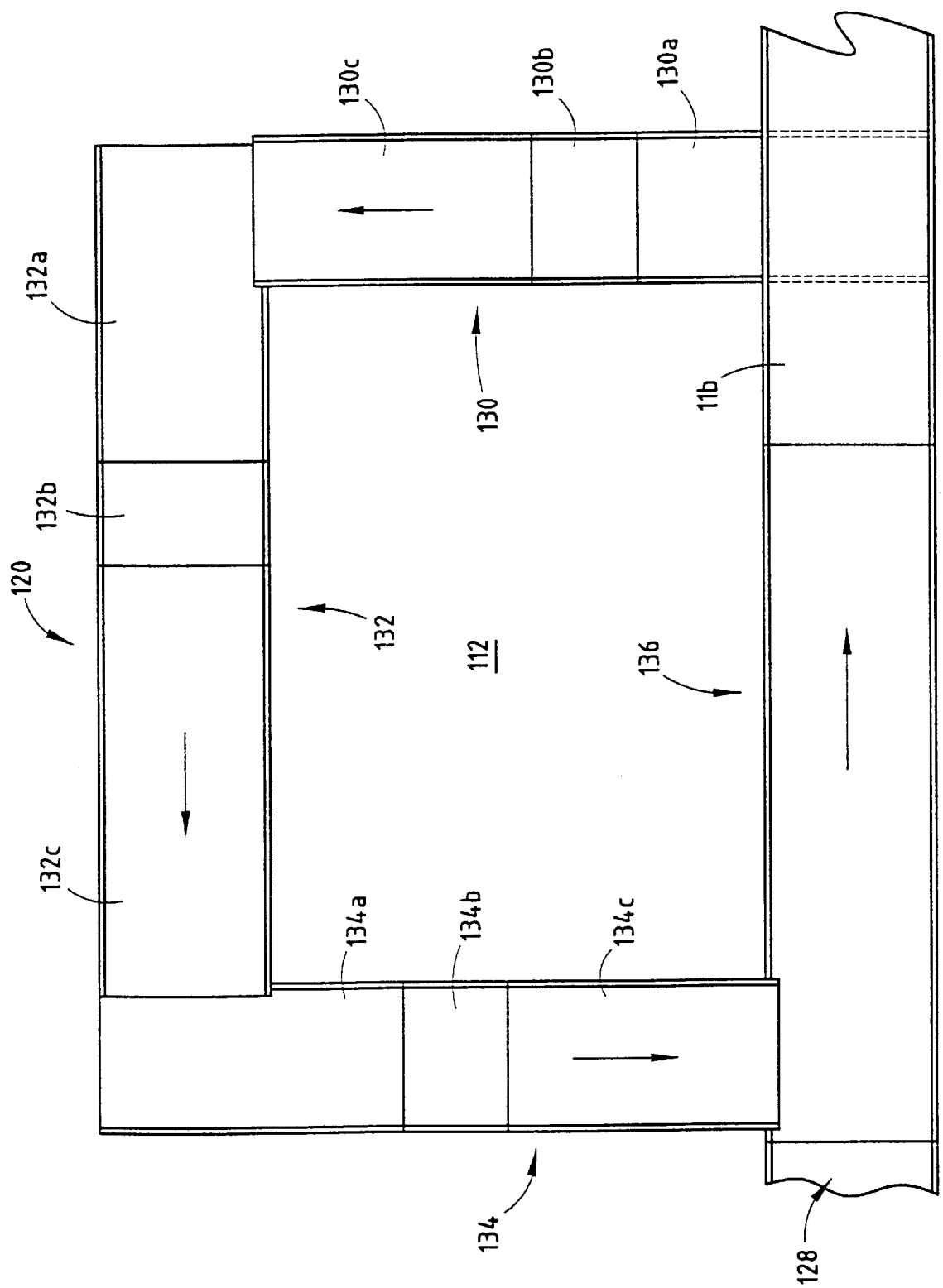
FIG. 4 is a top plan view of another destacking conveyor in accordance with the present invention.
Figure 5:
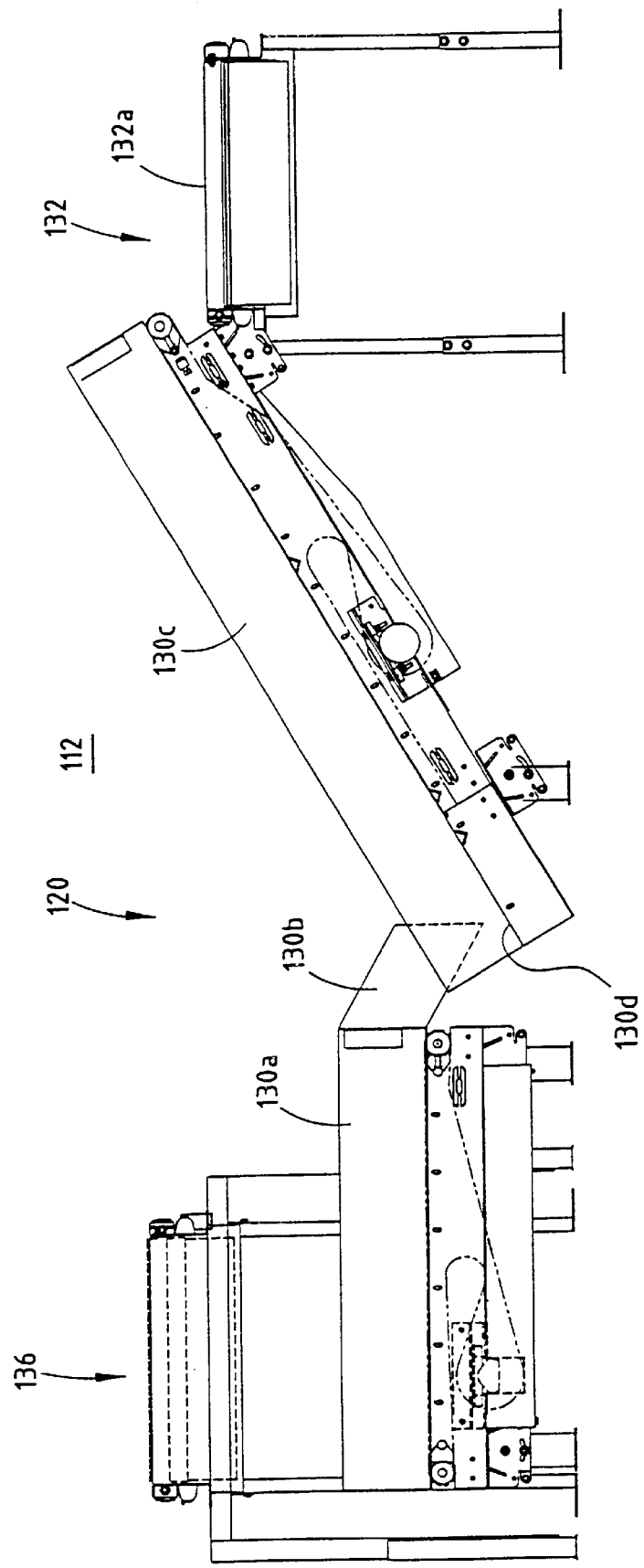
FIG. 5 is a side elevation of the destacking conveyor of FIG. 4.

Referring now to FIGS. 4 and 5, an alternate embodiment of a destacking conveyor 112 is operable to destack and separate articles as they are conveyed along a plurality of conveying portions 120. Similar to conveying portions 20 of destacker 12, conveying portions 120 include an input conveyor 128 (FIG. 5), a series of intermediate conveying portions or sections 130, 132, 134 and a discharge conveyor 136. Each of the intermediate conveyors are substantially similar to one another with the first intermediate conveying section 130 being shown in FIG. 5 as an example. Input conveyor 128 receives articles from conveyor 11a and conveys the articles upward along an inclined slope to a discharge end of input conveyor 128. The articles are discharged from input conveyor 128 onto intermediate conveying portion 130, which is positioned generally orthogonal to input conveyor 128. Intermediate conveyor 130 includes a generally horizontal conveying portion 13a, which conveys articles from input conveyor 128 and discharges the articles into a steering chute 130b, which further directs the articles downward and laterally inward onto an input end 130d of an inclined conveyor 130c. Inclined conveyor 130c then conveys the articles upward and onto the next downstream conveying section 132. Each of the intermediate conveying sections 132 and 134 are substantially similar to conveying section 130, and each of the conveyors and chutes of conveying sections 120 are substantially similar to the conveyors and chutes of the conveying sections 20, discussed above with respect to destacker 12, such that a detailed description is not included herein. Suffice it to say that each conveying portion 132, 134 also includes a first, generally horizontal belt conveyor 132a, 134a, a steering chute 132b, 134b, and an inclined belt conveyor 132c, 134c, respectively (FIG. 4). The height of each conveying section is selected with respect to the height of the input and discharge ends of the conveying sections at each end thereof.

Preferably, similar to destacking conveyor 12, discussed above, each subsequent conveying portion of destacker 112 is operable at a higher rate of speed than the previous adjacent conveying portion, such that the articles are sped up as they are conveyed along the destacking conveyor 112. It is further envisioned that some of downstream conveyors along one or more of the conveying portions 120 may be operable at a slower rate than the upstream conveyor of the same conveying portion, without affecting the scope of the present invention. The rate of conveyance may be selected depending on the particular application. For example, input conveyor 128 may be operable at a speed of approximately 60 feet per minute, while the horizontal conveyor 130a of conveying portion 130 may be operable at a speed of approximately 120 feet per minute. The inclined conveyor 130c may then be operable at a slower rate, such as at approximately 100 feet per minute, than the horizontal conveyor 130a. Additionally, the next horizontal conveying portion 132a may be operable at a greater speed of approximately 200 feet per minute, while the next inclined conveyor 132c may likewise be operable at a slower speed than the upstream, horizontal conveyor, such as at approximately 180 feet per minute. The inclined conveyor 132c conveys articles onto the next horizontal conveyor 134a, which may be operable at a greater speed of approximately 250 feet per minute. The next inclined conveyor 134c may then be operable at a speed greater than conveyor 134a, such as approximately 270 feet per minute, while the discharge conveyor 136 is operable at a greater speed of approximately 300 feet per minute. The increase in speeds between the consecutive belt conveyors, especially between the conveyors which convey the articles in a direction generally normal to the conveyance of the previous belt conveyor, further enhances separation and destacking of the articles as they are conveyed along destacking conveyor 112. A slower rate may be selected for the inclined conveyors in order to reduce slippage of articles on the belts as the articles are conveyed up the inclined conveyors. Optionally, the speeds may be adjusted in response to a detection of an insufficient or excessive gap between the articles, as discussed above with respect to destacker 12.

Figure 6:
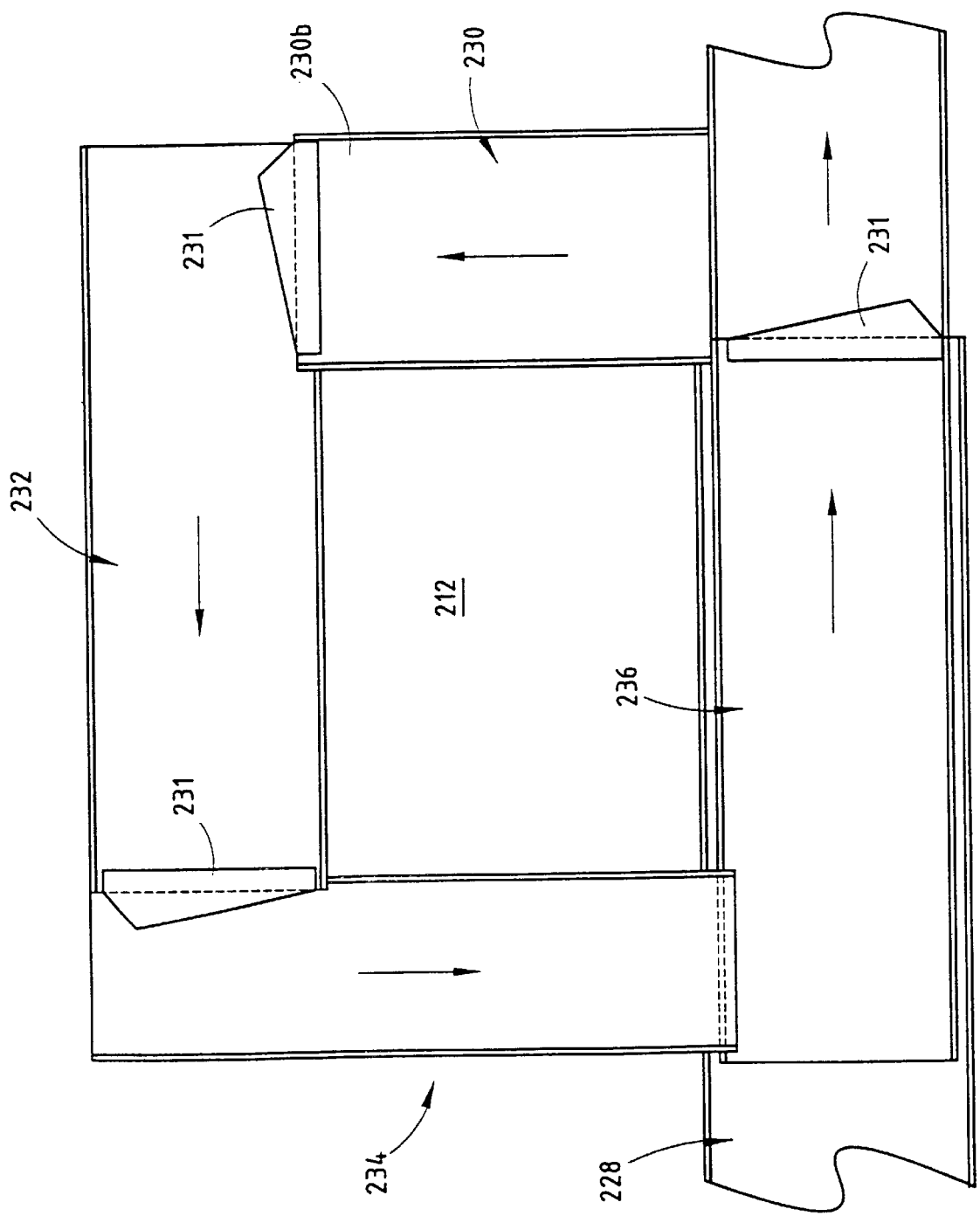
FIG. 6 is a top plan view of another destacking conveyor in accordance with the present invention.

Referring now to FIGS. 6 and 7, a third embodiment 212 of the destacking apparatus of the present invention includes an input conveyor 228 and three intermediate conveyors 230, 232 and 234 and a discharge conveyor 236. Each intermediate conveyor is an inclined conveyor which has an input end, such as end 230*a* of conveyor 230 (FIG. 7), positioned at a height below the discharge end of the previous conveyor, and a discharge end, such as end 230*b*, positioned at a height above the input end of the next downstream conveyor, such as conveyor 232. A transition plate 231 may be positioned between the discharge end of one incline conveyor and the input end of the next downstream conveyor, to guide the articles from one conveyor to the next and prevent articles from falling therebetween. Similar to destackers 12 and 112, discussed above, each of the subsequent conveyors of destacking conveyor 212 are operable at a greater speed than the previous or upstream conveyor. For example, the input conveyor 228 may be operable at a speed of approximately 60 feet per minute, while the intermediate conveyors 230, 232 and 234 may be operable at speeds of approximately 150 feet per minute, 175 feet per minute and 250 feet per minute, respectively. The discharge conveyor may then be operable at a speed of approximately 300 feet per minute. Additionally, the angles of incline of each of the intermediate conveyors may be substantially the same to one another, such as approximately 14 degrees in the illustrated embodiment, or may be different angles from one another and may be progressively decreasing angles, without affecting the scope of the present invention.

Referring now to FIGS. 8 and 9, another article separating or de-stacking conveyor 312 according to the present invention is operable to convey articles along successive conveyor portions, shown generally as 320, to cause the articles to de-stack or separate as they are conveyed. The conveyor portions 320 are downwardly inclined and convey the articles downward along the conveyors between an input conveyor 11*a* and a discharge or take-away conveyor 11*b*. Article separation or de-stacking conveyor 312 includes a support member 338 which supports conveyor portions 320. Conveyor portions 320 include a plurality of independently driven conveyors, each of which may be any type of conveyor, driven by any power source normally encountered in the art. For example, conveyors 320 may be belt conveyors as shown in the illustrated embodiment. Support member 338 includes a base 338*a* and a vertical column or member 338*b* extending therefrom (FIG. 9).

Conveyors 320 include an input conveyor 328 and an output conveyor 336 separated by one or more intermediate conveyors, such as three intermediate conveyors 330, 332, and 334 in the illustrated embodiment. Each conveyor 328, 330, 332, 334, 336 is positioned substantially orthogonal to the immediately adjacent upstream or downstream conveyor, such that an output end of each of the conveyors is proximate to an input end and transfers articles to an inner region of a respective adjacent downstream conveyor, similar to destackers 12, 112 and 212, discussed above. The conveyors 328, 330, 332, 334, 336 are cascading, or placed at a downwardly sloping angle, and are arranged such that articles drop a preselected distance as they are transferred from the output end of one conveyor, such as from input conveyor 328, to the input end of the next adjacent downstream conveyor, such as intermediate conveyor 330. Accordingly, the inner region at the output end of each conveyor is positioned above the inner region and proximate to the input end of the next or adjacent downstream conveyor. This slight drop between the output end and the downstream input end of adjacent conveyors further aids in the separation of articles as they are conveyed along destacker 12.

The articles received by input conveyor 328 of destacker 312 are at their highest elevation on destacker 312. As the articles travel in a downward direction from input conveyor 328, through intermediate conveyors 330, 332, 334, and onto output conveyor 336, the downwardly sloping orientation of the conveyors 320 affects the separation and the de-stacking of the articles by gravity. The conveyors define a generally square or rectangular and downward spiraling loop, such that output conveyor 336 conveys articles in generally the same direction of travel as input conveyor 328. Alternately, the conveyors may be oriented inline with one another, as discussed above with respect to de-stacking conveyor 12', without affecting the scope of the present invention.

To further increase the separation between articles conveyed along separation conveyor 312, each subsequent or downstream conveyor may be driven at a successively higher speed, from input conveyor 328 to output conveyor 336. Consequently, as articles are conveyed between adjacent conveyors, the higher speed of the downstream conveyor upon which the articles are being received increases the distance between the articles by providing an acceleration at the interface between conveyors. Preferably, each conveyor is driven at a speed approximately twice as great as the immediately upstream conveyor, with input conveyor 328 driven at the lowest speed and output conveyor 336 driven at the highest speed. For example, input conveyor 328 may be driven at a speed of approximately 10 feet per minute (FPM), intermediate conveyor 330 may be driven at a speed of approximately 20 FPM, conveyor 332 may be driven at a speed of approximately 40 FPM, conveyor 334 may be driven at a speed of approximately 80 FPM, and output conveyor 336 may be driven at a speed of approximately 160 FPM. The combination of increasing speed and the orthogonal orientation between the conveyors effectively de-stacks and separates articles traveling thereupon. The speeds may be constant or variable to account for changes in gap or separation distances between the articles, as discussed above.

As shown most clearly in FIG. 9, the conveyors are secured to vertical member 338*b* by one or more support rods 342 projecting generally horizontally from vertical member 338*b* of support member 338. Vertical member 338*b* is positioned such that it is proximate to inner support member 340 of each conveyor. Support rods 342 may be attached to an undersurface 346 of each conveyor by any method commonly employed in the art. For example, as illustrated in FIG. 9, support rods 342 may be received by C-Shaped flanges or brackets 348, which are secured to undersurface 346 of each conveyor. It will be appreciated by those with ordinary skill in the art that other means for supporting the conveyors on support member 338 may be utilized without departing from the spirit and scope of the present invention.

Preferably, support member 338 is adjustable to thereby enable the repositioning of destacking conveyors 320 therealong. Vertical member 338b may be formed with a plurality of throughholes (not shown) along its length to enable adjustable repositioning of support rods 342 to support each of the individual conveyors at a desired height. Alternately, a vertical column or member (also not shown) may be a telescoping member having two or more sections coupled to a power source for telescopingly extending and retracting the vertical member to thereby place article destacking conveyor 312 at a desired height.

Accordingly, the destacker of the present invention provides adjacent conveying portions, each of which includes an inclined conveyor. The conveying portions may include a steering chute to guide or steer the articles from one conveyor toward the inner wall of the next downstream conveyor. The conveying portions may be positioned orthogonally to one another or may be generally aligned with one another. Preferably, the speed of each conveying portion is greater than the speed of the previous or upstream conveying portion, in order to enhance destacking and separation of articles, and may be variable to account for changes in gap distances between articles. The angle of incline of each inclined conveyor may be selected to progressively decrease from one conveyor to the next, depending on the application.

In certain conveyor systems, the volume or quantity of articles being transported may require two or more of the article de-stacking conveyors of the present invention to effectively separate and de-stack articles. In such applications, a first de-stacking conveyor may be positioned upstream from a second destacking conveyor. The downstream article destacking conveyor is operably connected to a take-away conveyor. The operation and structure of the second or downstream article destacking conveyor may be identical to the first article de-stacking conveyor, or may be a different embodiment from the upstream destacking conveyor. Each article destacking conveyor is configured to de-stack and substantially singulate articles travelling therealong. The use of a pair of article destacking conveyors enables the conveyor system to adequately separate articles during a period of increased article quantity, and thus largely eliminates the formation of bottlenecks, and the need to temporarily shutdown a conveyor line. It will be recognized to those with ordinary skill in the art that any number of article de-stacking conveyors may be utilized to effectively de-stack and separate articles and that such article destacking conveyors may be positioned in a successive downstream orientation between an infeed conveyor and a take-away conveyor. Additionally, one or more de-stacking conveyors may be positioned upstream from a side by side eliminating conveyor and/or a separate aligning conveyor, as discussed below.

Figure 10:
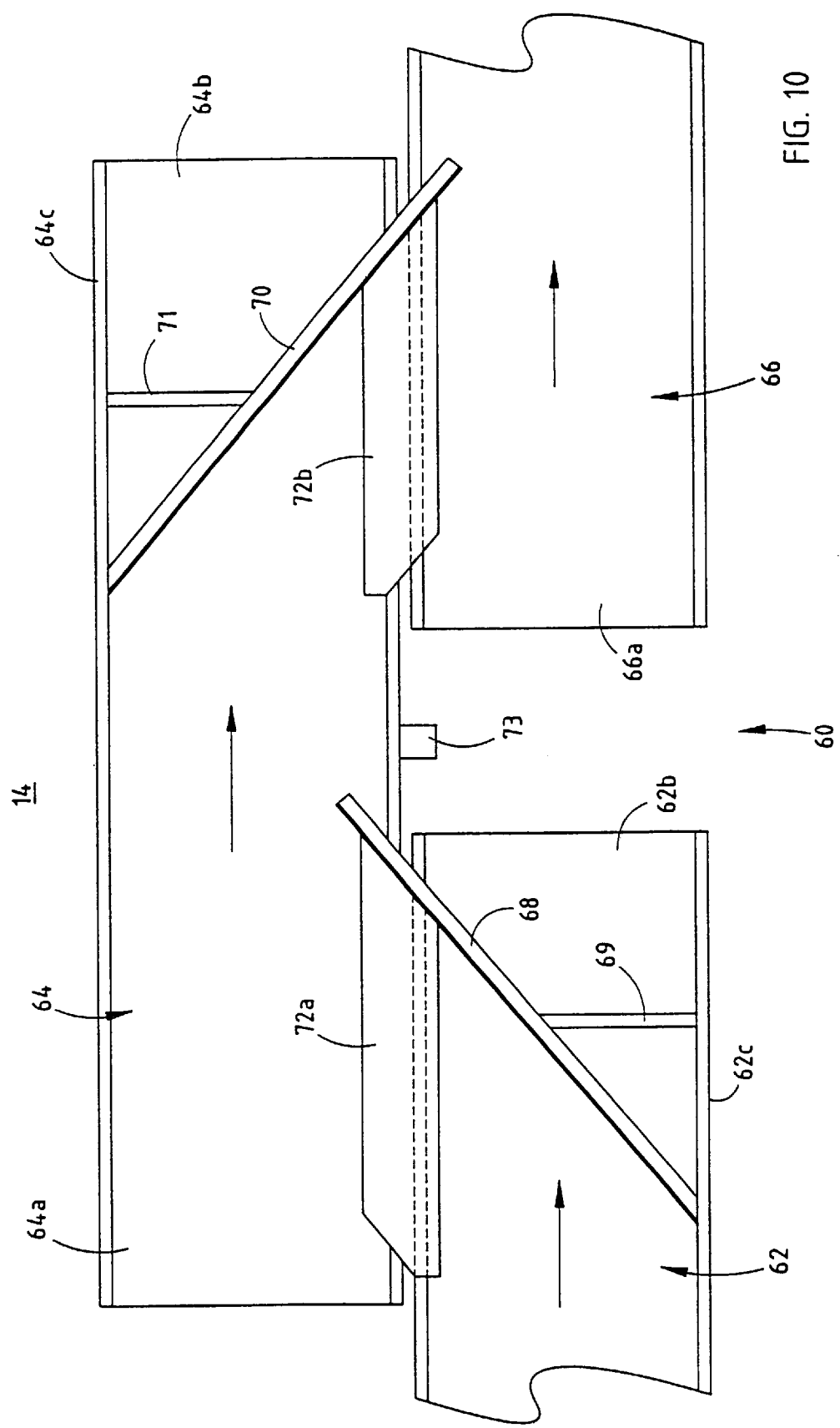
FIG. 10 is a top plan view of a side by side eliminating conveyor in accordance with the present invention.
Figure 11:
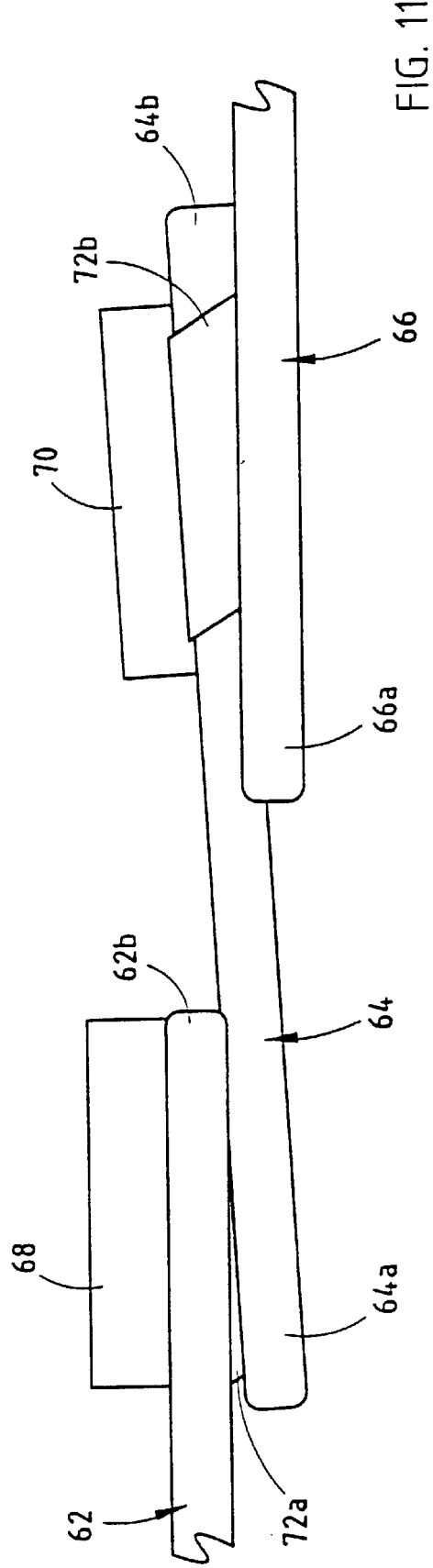
FIG. 11 is a side elevation of the side by side eliminating conveyor of FIG. 10.

Referring now to FIGS. 10 and 11, article singulator and destacker or side by side eliminating conveyor 14 is positioned downstream of a conveying portion, such as at take-away conveyor 11b or immediately downstream of the discharge end of destacking apparatus 12 or the like (FIG. 1). Article singulator 14 is operable to align and unstack articles, such as boxes, packages and/or the like, and to arrange the articles along the conveyor in an in-line, non-stacked manner as the articles are continuously conveyed by conveyor system 10.

In the illustrated embodiment of FIGS. 10 and 11, side by side eliminating conveyor 14 includes a conveyor portion 60, which further includes an upstream conveyor or conveying surface 62, a side conveyor or conveying surface 64 and a downstream conveyor or conveying surface 66. The conveyors are shown as continuous belt conveyors or belt conveying surfaces. However, the conveying surfaces may be other conveying surfaces, such as powered roller surfaces or the like, without affecting the scope of the present invention.

Figure 13:
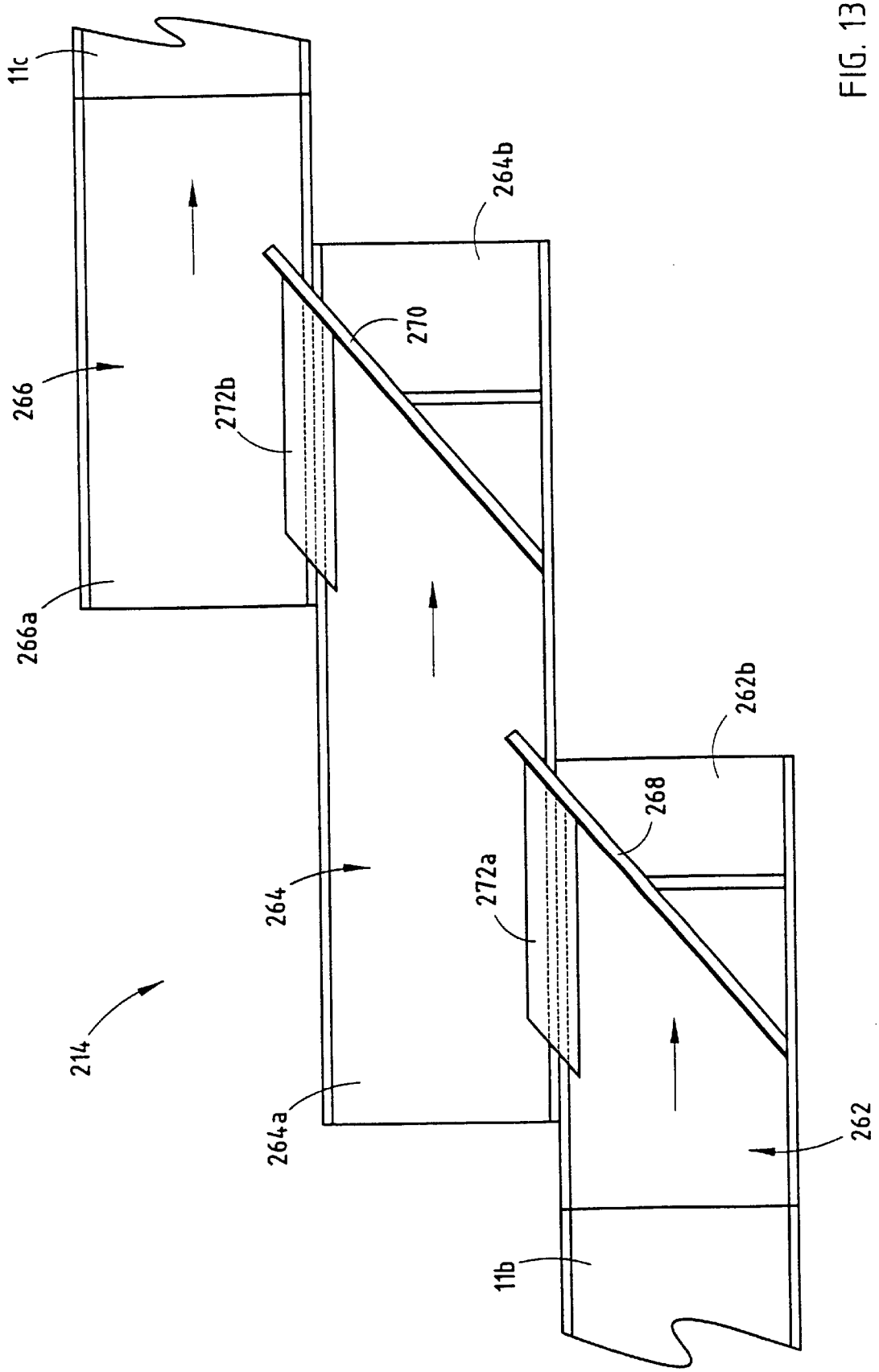
FIG. 13 is a top plan view of another embodiment of a side by side eliminating conveyor in accordance with the present invention.

Article side by side eliminator 14 includes a first angled wall or diverting arm or redirecting member 68 positioned across upstream conveying surface 62, and a second diverting arm or redirecting member 70 positioned across side conveying surface 64. The redirecting members 68, 70 extend at an angle across each of the conveying surfaces 62, 64 and function to redirect articles from upstream conveying surface 62 to side conveying surface 64 and from side conveying surface 64 to downstream conveying surface 66, respectively, as discussed below. Each of the redirecting members 68, 70 are generally vertical plates or walls which are mounted to a support frame 62c, 64c of conveying surfaces 62, 64, respectively. As shown in FIG. 10, each redirecting member 68, 70 may extend from their respective conveying surface 62, 64 and partially across the respective laterally adjacent and downstream conveying surface 64, 66, in order to insure that articles are redirected fully onto the next downstream conveyor. A support bar 69, 71 may be provided at each redirecting member 68, 70, respectively, to support the redirecting members and prevent or limit flexing or movement of the redirecting members during operation of side by side eliminator 14. Redirecting members 68, 70 may be metal frames or walls or may be made from non-metallic materials, without affecting the scope of the present invention. Preferably, the redirecting members 68, 70 are positioned immediately above the respective conveying surfaces and may slidably engage the belt of the respective conveyor, in order to substantially preclude articles from sliding between redirecting members 68, 70 and the belts of the respective conveyors 62, 64. It is further envisioned that the support members 69, 71 may be adjustably mounted along a respective sidewall or frame 62c, 64c of the conveying portion 62, 64 and along the rearward side of redirecting members 68, 70, such that the angle of redirecting members 68, 70 with respect to the direction of conveyance may be adjusted (as shown in FIG. 13) to optimize performance of side by side eliminator 14 for the particular application. A transition support plate 72a, 72b may be provided between the respective conveying surfaces 62, 64 and 64, 66, to provide support of the articles as they are transferred from one conveying surface to the next and prevent articles from falling between the conveyors.

As shown in FIG. 11, a downstream end 62b of upstream conveying surface 62 may be positioned at a height above an upstream end 64a of side conveying surface 64. Side conveying surface 64 may be angled or inclined upwardly such that a downstream end 64b is positioned at a height above upstream end 64a and also at a height above an upstream end 66a of downstream conveying surface 66. This arrangement allows the articles to move from an upper conveying surface to a lower conveying surface as they travel through side by side eliminator 14 to further enhance separation of articles being conveyed therealong. Although shown as being positioned at a height below downstream end 62b of upstream conveying surface 62, upstream end 66a of downstream conveying surface 66 may be positioned at substantially the same level as upstream conveyor 62, without affecting the scope of the present invention. It is further envisioned that the heights of all three of the conveying surfaces may be substantially the same, such that the articles are transferred generally horizontally from one conveying surface to the next, without affecting the scope of the present invention.

During operation, articles are received by upstream conveyor 62 from conveyor 11b of conveyor system 10 or directly from the discharge end of destacker 12 or from one of the intermediate conveying portions, as shown in FIG. 1. As articles are conveyed along conveyors 60, the articles impact redirecting member 68 at upstream conveying surface 62 and are guided from upstream conveying surface 62 onto transition plate 72a and further onto side conveying surface 64. As the articles are conveyed further along side conveying surface 64, the articles impact redirecting member 70 at side conveying surface 64 and are then guided from side conveying surface 64 onto transition plate 72b and further onto downstream conveying surface 66. The redirecting members 68, 70 thus function to guide and separate the articles as they are conveyed along conveyor portion 60. Stacked articles will tend to be unstacked as the articles impact the redirecting members and as the articles are moved across the transition plates and onto the next conveying surface, whereby the articles will be discharged from downstream conveyor 66 onto take-away conveyor 11c in a generally destacked and aligned manner. Article side by side eliminator 14 thus substantially precludes the possibility that any articles will be arranged in a side by side or stacked manner when they reach downstream conveyor 66 and take-away conveyor 11c. Side by side eliminator 14 may be operable upstream or downstream of de-stacking device, such as discussed above, and/or an aligning device such as discussed below, or may be implemented at a separate conveyor system independent of the de-stacking and aligning devices, without affecting the scope of the present invention.

Optionally, the conveying surfaces 62, 64, 66 may be operable at different speeds from one another to assist in creating gaps between the articles as they move through side by side eliminator 14. More particularly, side conveying surface 64 may be operable at a conveying speed which is greater than the speed of upstream conveying surface 62, while downstream conveying surface 66 may be operable at a conveying speed which is greater than the speed of side conveying surface 64. Because the side conveying surface 64 is operating at a faster conveying rate than the upstream conveying surface 62, as one article is transferred onto side conveying surface 64, the article is moved further downstream than another article which is still located on upstream conveying surface 62. A similar result occurs between side conveying surface 64 and downstream conveying surface 66. This provides additional gaps between articles as they are conveyed along conveyor portion 60 of side by side eliminator 14, and is especially useful in separating articles which may be traveling side by side or on top of one another at upstream conveying surface 62. Similar to destacker 12, discussed above, side by side eliminating conveyor 14 may include one or more photo eyes or sensors 73 (FIG. 10) which are operable to detect a separation or gap between articles conveyed along side by side eliminating conveyor 14. A control (not shown in FIGS. 10 and 11) may then be operable to adjust the conveyance speeds of conveyors 62, 64, 66 in response to an insufficient or excessive gap being detected. As discussed above, the speed adjustment may be continuous and may be a selected amount for one or more conveyors or a proportional adjustment of all of the conveyors. It is further envisioned that a single control (such as control 35 of FIG. 2) may be operable to adjust the speeds (either a selected amount or a proportional adjustment) of all of the conveyors on both the destacking conveyor and side by side eliminating conveyor 14 in response to one or more of the sensors 37, 73 of conveyor system 10.

Additionally, it is envisioned that the coefficient of friction of the conveying surfaces 62, 64 and 66 may be selected to allow and control slippage of the articles, such that the articles rotate or slide along one or more of the conveying surfaces as the articles are redirected by redirecting members 68, 70 of side by side eliminator 14. More particularly, upstream conveying surface 62 and side conveying surface 64 may have a conveyor belt or surface having a lower coefficient of friction than a conveyor belt or surface of downstream conveyor 66. The lower coefficient of friction allows the articles to rotate and slide as they move from upstream conveying surface 62 to side conveying surface 64 and as they move along redirecting member 70 at side conveying surface 64. As the articles arrive on downstream conveying surface 66, the higher coefficient of friction of downstream conveying surface 66 functions to grip the articles and move the articles downstream. This ensures that there will be gaps between the articles, since they will slide less along downstream conveying surface 66 as they are discharged from side conveying surface 64. However, the conveying surfaces may have the same coefficient of friction or other combinations of gripping characteristics, without affecting the scope of the present invention.

Figure 12:
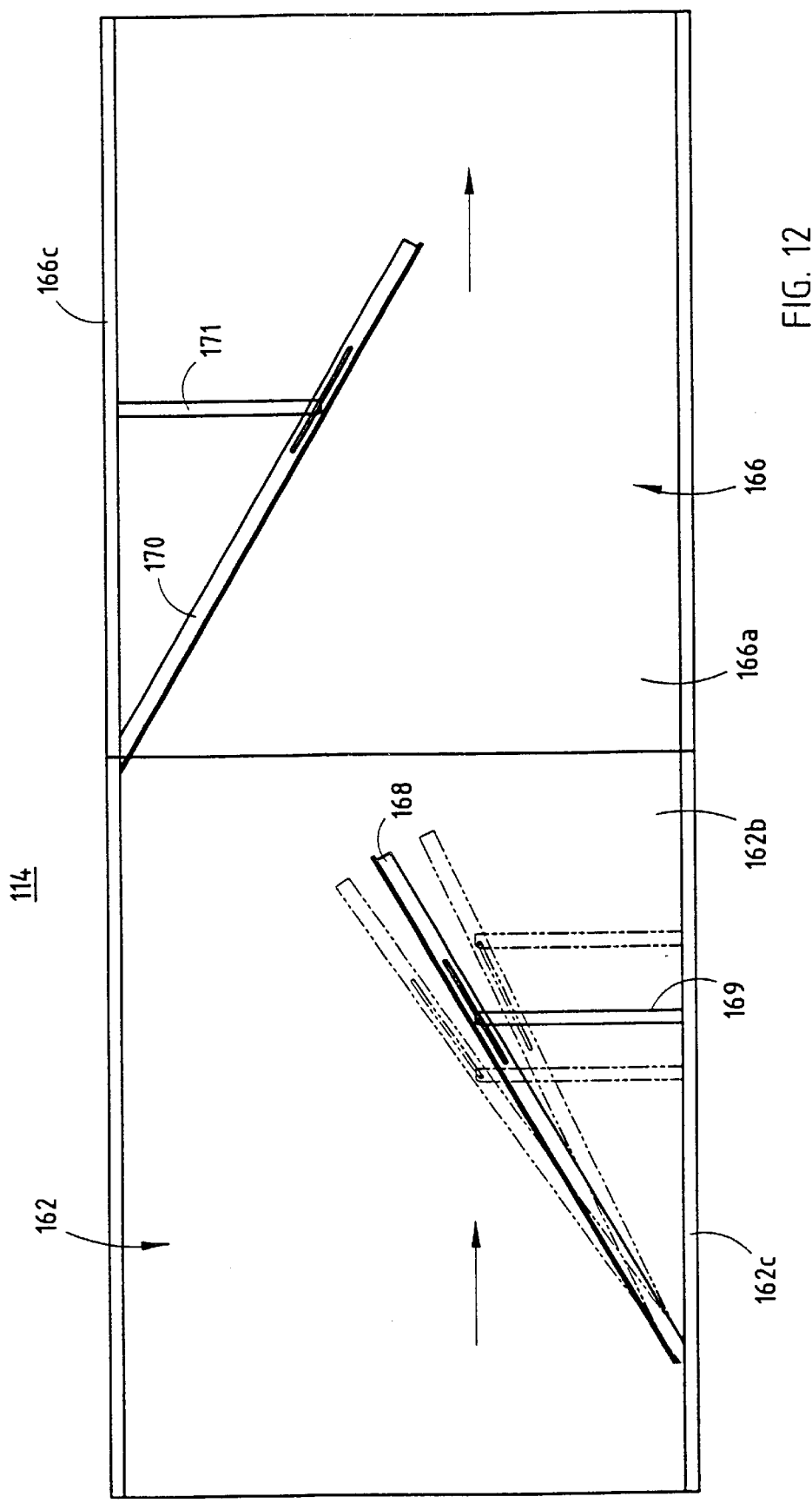
FIG. 12 is a top plan view of another embodiment of a side by side eliminating conveyor in accordance with the present invention.

Referring now to FIG. 12, an alternate embodiment of an article singulator and destacker or side by side eliminating conveyor 114 includes a pair of diverting arms or redirecting members 168 and 170 positioned at and partially across an upstream conveying surface 162 and a downstream conveying surface 166, respectively. Upstream and downstream conveying surfaces 162, 166 are generally aligned with one another. Redirecting member 168 is positioned at an angle along and extending from one side frame 162c of upstream conveying surface 162 and extends partially across a downstream end 162b of upstream conveying surface 162. Similarly, redirecting member 170 is positioned at a generally opposite angle extending from an opposite side frame 166c of downstream conveying surface 166 and extends partially across an upstream end 166a of downstream conveying surface 166. Each redirecting member 168, 170 is further supported by a support arm 169, 171 mounted at the redirecting members 168, 170 and the respective sidewalls 162c, 166c. In the illustrated embodiment, the support arms 169, 171 are adjustably mounted to redirecting members 168, 170 and sidewalls 162c, 166c, respectively, to facilitate adjustment of the angle of the redirecting members 168, 170 with respect to the direction of conveyance of the conveying portions 162, 166, as represented by the phantom lines in FIG. 12.

Upstream and downstream conveying surfaces 162, 166 may be double width conveying surfaces to facilitate positioning redirecting members 168, 170 partially across the conveying surface, without adversely affecting the maximum width or size of articles or packages which may be conveyed along the conveying surfaces. As discussed above with respect to article side by side eliminator 14, downstream conveying surface 166 may be operable at a higher rate or speed than upstream conveying surface 162, in order to assist in providing gaps between articles conveyed through side by side eliminator 114. It is further envisioned that upstream conveying surface 162 and downstream conveying surface 166 may be combined as a single conveying surface (not shown), with redirecting members positioned along opposite sides of the single conveying surface, without affecting the scope of the present invention.

Referring to FIG. 13, an alternate embodiment of an article singulator or side by side eliminating conveyor 214 includes three conveying portions 262, 264, 266 arranged in a generally laterally stepped manner, such that an intermediate conveying portion 264 is positioned downstream and laterally to one side of an input conveying portion 262, while a discharge conveying portion 266 is positioned downstream and laterally offset from intermediate conveyor 264 and on the opposite side of intermediate conveyor 264 from the upstream conveyor 262. Side by side eliminating conveyor 214 includes a pair of diverting arms or redirecting members 268, 270 positioned toward a downstream end of the respective conveying portions 262, 264. Additionally, a pair of transition plates 272a and 272b may be positioned to bridge the gap between the adjacent sides of input conveyor 262 and intermediate conveyor 264 and the adjacent sides of intermediate conveyor 264 and discharge conveyor 266, respectively.

The overall construction and operation of side by side eliminating conveyor 214 is substantially similar to side by side eliminating conveyor 14, discussed above, such that a detailed description will not be repeated herein. Suffice it to say that side by side eliminating conveyor 214 is especially applicable where the infeed conveyor 11b is laterally offset from the take-away or output conveyor 11c. The input conveyor 262 of side by side eliminating conveyor 214 receives articles from conveyor 11b and redirects the articles via redirecting member 268 onto intermediate conveyor 264, which further redirects the articles further laterally toward and onto the downstream or discharge conveyor 266, whereby the articles are discharged from side by side eliminating conveyor 214 onto take-away conveyor 11c. Similar to side by side eliminating conveyor 14, discussed above, the conveying portions 262, 264, 266 may be operable at different speeds from one another to enhance separation of the articles as they are conveyed therealong. Likewise, intermediate conveyor 264 may be inclined, such that an input end 264a is positioned below a discharge end 262b of conveyor 262, while a discharge end 264b of intermediate conveyor 264 is positioned above an input end 266a of discharge conveyor 266, to enhance separation of the articles, as discussed above with respect to side by side eliminating conveyor 14.

Figure 14:
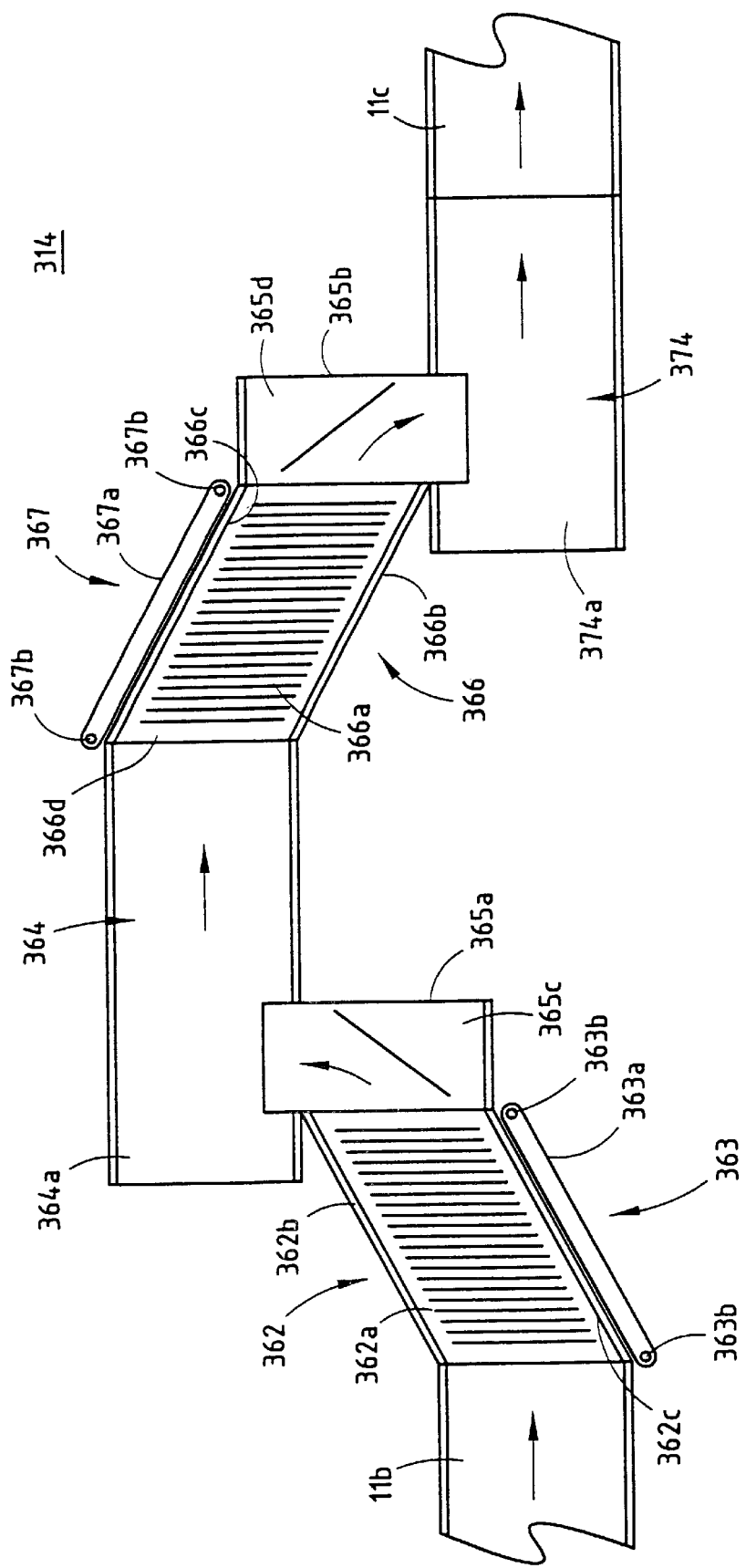
FIG. 14 is a top plan view of yet another embodiment of a side by side eliminating conveyor in accordance with the present invention.

Referring now to FIG. 14, another embodiment 314 of a side by side eliminating conveyor according to the present invention includes a pair of angled roller conveying portions 362 and 366, which include a plurality of rollers 362a, 366a and a vertically oriented conveyor 363, 367, respectively. Each of the angled roller sections 362, 366 discharge articles into a chute 365a, 365b, which directs the articles downward and laterally across the chute and onto a respective conveying portion 364, 374. Conveying portion 364 is preferably upwardly inclined and conveys the articles upward and onto an input end 366d of angled conveying portion 366, while conveying portion 374 is likewise preferably inclined and conveys the articles upward and downstream and onto a take-away conveyor 11c, or onto an aligning conveyor or the like, such as an aligning conveyor 16', as shown in FIG. 1 and discussed below.

Rollers 362a, 366a of angled conveyors 362, 366 are connected between the sidewalls 362b, 366b of conveyors 362, 366 and are oriented generally normal to the direction of conveyance of the input conveyor 11b, as can be seen in FIG. 14. The vertical conveyors 363, 367 are belt conveyors having a continuous belt 363a, 367a routed and driven around a pair of rollers 363b, 367b positioned at opposite ends of the respective conveyor portions 362, 367. Vertical conveyors 363, 367 are positioned along a downstream side 362c, 366c of conveyors 362, 366 such that a lower edge (not shown in FIG. 14) of the conveyor belts 363a, 367a are positioned below the conveying surfaces defined by the respective rollers 362a, 366a. Conveying portions 362, 366 and vertical conveyors 363, 367 are substantially similar to the conveying portions of aligning conveyor 16, discussed below with respect to FIGS. 15–17, such that reference to FIG. 17 will show the relationship between the vertical conveyor belts 363a, 367a and the conveying surface of conveying portions 362, 366 of side by side eliminating conveyor 314.

Rollers 362a, 366a of conveying portions 362, 366 are driven via any known means, such as a chain or belt or powered rollers and convey the articles in generally the same direction as conveyor 11b, such that the articles are conveyed into the vertical conveyor belts 363a, 366a and guided along downstream sides 362c, 366c of conveyors 362, 366 via movement of conveyor belts 363a, 367a and rollers 362a, 366a. By providing the vertical conveyors 363, 367 along one side of the angled conveying sections 362, 366, and by positioning the belts 363a, 367a such that a lower edge of the belt is below the conveying surface defined by the roller conveyors, side by side eliminating conveyor 314 substantially precludes smaller articles from becoming lodged between the diverting or redirecting vertical conveyor belt and the roller conveyor portion. Although shown as roller conveyors, conveyors 362, 366 may be other forms of conveyors which are operable to convey articles in a direction which is generally the same as the direction of conveyance of the infeed and/or takeaway conveyors, while being positioned at an angle with respect to the infeed or takeaway conveyors, without affecting the scope of the present invention. For example, the angled conveyors may include a plurality of continuous thin belts of differing lengths aligned with the direction of conveyance of the infeed or takeaway conveyor.

Articles are discharged from angled roller conveyor 362 onto redirecting or steering chute 365a, which includes a raised side portion 365c and functions to guide or direct the articles downwardly and laterally toward an input end 364a of inclined conveyor 364. Inclined conveyor 364 is substantially similar to inclined side conveyor 64 of side by side eliminating conveyor 14 and conveys articles upward and along conveyor 364 and discharges the articles onto input end 366d of angled roller conveyor 366. Conveyor 366 and vertical conveyor 367 function to convey and guide articles downstream and laterally in an opposite direction from conveying portion 362 and vertical conveyor 363. Roller conveyor 366 discharges the articles into steering chute 365b, which is substantially identical to chute 365a and includes a raised portion 365d to guide the articles laterally and downwardly onto an input end 374a of the second inclined conveyor 374. Inclined conveyor 374 then conveys the articles upwardly and along conveyor 374 and discharges the articles onto take-away conveyor 11c. However, inclined conveyor 374 may otherwise discharge the articles onto any other conveying portion, such as onto an input end of an aligning conveyor, as discussed below with respect to FIG. 22, without affecting the scope of the present invention. Although shown as having angled conveyor 366 and vertical conveyor 367 oriented in a laterally opposite direction of angled conveyor 362 and vertical conveyor 363, clearly the scope of the present invention includes a side by side eliminating conveyor which orients the second conveying portions such that the articles are conveyed further laterally in the same direction of the first conveying portion 362, similar to the arrangement of side by side eliminating conveyor 214, discussed above.

It is further envisioned that the speed of rollers 362a, 366a may be selected to convey articles at a higher rate of speed than the speed of conveyor belts 363a, 367a of vertical conveyors 363, 367. Vertical conveyors 363, 367 then may function to slow down articles which contact conveyor belts 363a, 367a in order to allow articles, which may be laterally adjacent to the article contacting the belt, to pass the contacting article and thereby further reduce or eliminate any side by side positioning of the articles. Additionally, as discussed above with respect to side by side eliminating conveyor 14, the speed of each subsequent conveying portion may be selected to be at a higher rate of conveyance than the previously adjacent or upstream conveying portions, in order to further enhance separation of the articles as they are conveyed along side by side eliminating conveyor 314.

Figure 17:
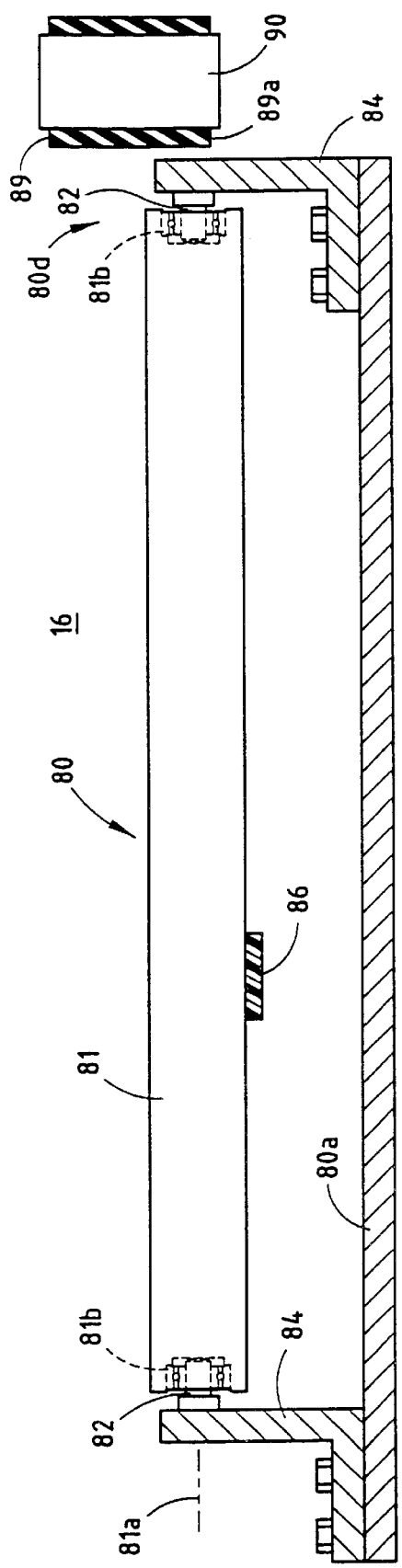
FIG. 17 is a partial sectional view of the aligning conveyor taken along the line XVII—XVII in FIG. 15.

Referring now to FIGS. 15–17, an aligning conveyor 16 includes an angled roller conveying portion 80, which is positioned between conveying portion 11c and take-away conveyor 11d, which is laterally offset from conveying portion 11c. Roller conveyor 80 includes a plurality of rollers 81 extending thereacross. Rollers 81 are mounted at opposite ends to a conveyor frame 80a, such that they extend across frame 80a and rotate about axes 81a (FIG. 17) which are generally normal to the direction of conveyance along take-away conveyors 11c and 11d. As shown in FIG. 15, articles move generally left to right along conveyors 11c, 80 and 11d, while rollers 81 are oriented generally vertically along conveying portion 80. Because rollers 81 are oriented normal to the direction of conveyance of conveyors 11c and 11d, the rollers may be all the same length and have no gaps between the rollers at each end 80b, 80c and the respective conveyors 11c, 11d. Rollers 81 are preferably small diameter rollers secured at each end to frame 80a and are positioned close to one another along conveyor portion 80 to form a generally continuous conveying surface. As shown in FIG. 17, each roller 81 may receive a bearing 81b at each end and rotate therearound. Bearings 81b may be mounted to an axle or pin 82 extending from a bracket 84 mounted to the conveyor frame 80a. Preferably, rollers 81 are rotatably driven via a belt or chain 86, which is further driven by a motor or other known drive means 87. However, rollers 81 may be driven via other known means without affecting the scope of the present invention.

Aligning conveyor 16 also includes a vertically oriented conveyor 88 positioned along a downstream side 80d of conveyor portion 80. Vertical conveyor 88 defines a generally vertical conveying surface along the downstream side 80d and is operable to guide and move the articles along downstream side 80d as they are conveyed along conveying portion 80 via rotation of rollers 81. Vertical conveyor 88 is preferably a belt conveyor which includes an endless conveyor belt 89 defining the generally vertical conveying surface. The conveyor belt 89 is guided around a pair of rollers or pulleys 90, each of which is positioned at an opposite end of conveyor 80 along downstream side 80d. As shown in FIG. 17, vertical conveyor 88 is mounted along downstream side 80d such that a lower edge 89a of endless conveyor belt 89 is positioned at least slightly beneath the conveying surface defined by the plurality of rollers 81. This substantially precludes articles from becoming lodged beneath the lower edge 89a of belt 89 as they are conveyed therepast. Vertical conveyor belt 89 may be driven via any known means, such as a conventional motor (not shown) or the like, and is preferably driven at a rate which is less than the rate or speed of articles being moved by rollers 81. By moving the vertical conveyor belt 89 at a slower speed than rollers 81, vertical conveyor 88 further functions to slow down each article as the article comes into contact with belt 89, in order to assist in eliminating any side by side relationship between articles and to assist in reducing gaps between consecutive articles moving along aligner 16 and conveyor system 10.

As shown in FIG. 15, the downstream take-away conveyor 11d is substantially laterally offset from the upstream conveyor 11c, with conveying portion 80 of aligning conveyor 16 extending therebetween. The degree of offset between conveying portions 11c and 11d is preferably selected such that an article traveling along one side 11e of upstream conveyor 11c will at least partially contact vertical conveyor belt 89, such that the article will be aligned on the opposite side 11f of the downstream conveyor 11d after it has been conveyed through aligning conveyor 16. Accordingly, as the articles are continuously conveyed in generally the same direction of conveyance as input conveyor 11c, the articles are conveyed partially toward belt 89 of vertical conveyor 88 along the downstream side 80d of roller conveyor 80, where the articles engage conveyor belt 89 and are guided along downstream side 80d of conveyor 80 via movement of belt 89 and rotation of rollers 81. As the articles are discharged from the downstream end 80c of conveying portion 80, the articles are received by and guided along take-away conveyor 11d in a generally aligned and arranged manner along side 11f of take-away conveyor 11d. The articles are thus aligned and spaced apart for scanning and identification by the scanning device downstream from take-away conveyor 11d.

Figure 18:
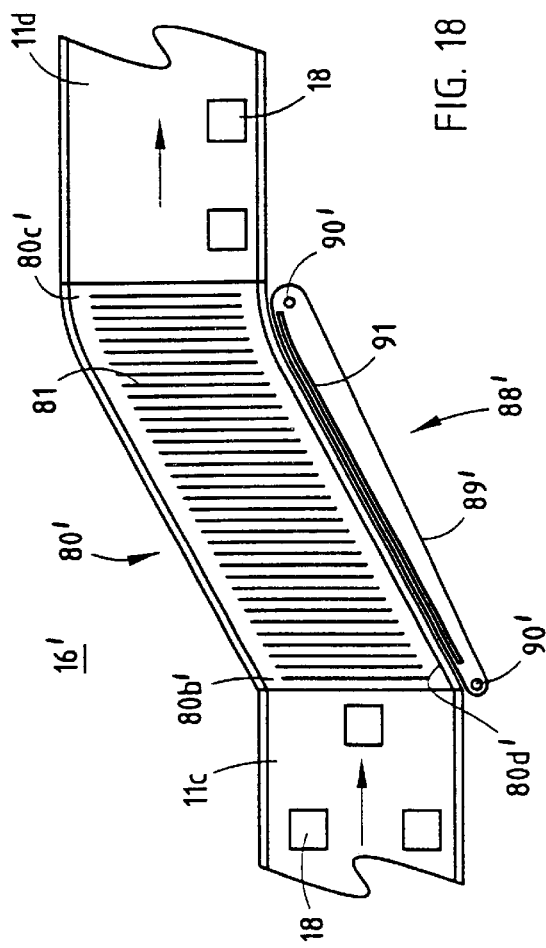
FIG. 18 is a top plan view of another embodiment of an aligning conveyor in accordance with the present invention.

As shown in FIGS. 1 and 18, another embodiment of an aligning conveyor 16' of the present invention may include an arcuate or curved conveying portion 80'. Curved conveying portion 80' is substantially similar to conveying portion 80 and includes a plurality of rollers 81 extending laterally across conveying portion 80' and generally normal to the direction conveyance of the upstream and downstream conveyor 11c and 11d, respectively. However, conveying portion 80' is curved to provide a smooth transition between an input end 80b', which is angled relative to infeed conveyor 11c, and an output end 80c', which is generally aligned with take-away conveyor 11d. Aligning conveyor 16' further includes a curved vertical conveyor 88' which extends along a downstream side 80d' of conveyor portion 80' and which is curved to correspond to the curvature of curved conveyor portion 80'. Vertical conveyor 88' is substantially similar to vertical conveyor 88 and includes an endless conveyor belt 89' which is guided about a pair of rollers or pulleys 90' at opposite ends of conveying portion 80'. Conveyor belt 89' is further guided and supported along a curved flange or plate 91, which is curved to match the curvature of conveyor portion 80' and is mounted along side 80d' of conveyor portion 80'. Aligning conveyor 16' is otherwise substantially similar to aligning conveyor 16, discussed above, such that a detailed description of the remaining components will not be repeated herein.

Similar to aligning conveyor 16, aligning conveyor 16' functions to guide and align articles received from upstream conveyor 11c along conveying portion 80', such that the articles are generally aligned and properly spaced as they exit conveyor portion 80' onto downstream or take-away conveyor 11d. Aligning conveyor 16' provides a means for aligning the articles such that they are discharged onto the output or takeaway conveyor in a generally in line manner. The curved conveying portion 80' and curved vertical conveying belt 89' provide a smooth transition from the lateral movement along the angled conveying portion 80b' to the downstream movement along the aligned portion 80c' and take-away conveyor 11d, thereby minimizing any lateral movement of articles as they are discharged onto takeaway conveyor 11d. This helps to limit the lateral movement of the articles as they exit the aligning conveyor 16', such that the articles are substantially aligned along side 11f of downstream take-away conveyor 11d upon discharge from aligning conveyor 16'. The curved conveying portion 80' and correspondingly curved vertical conveyor belt 89' are especially useful in applications where the speed of the articles traveling along the conveying portion of the aligning conveyor may cause the articles to slide laterally away from side 11f of downstream or take-away conveyor 11d as they are discharged from a generally straight conveying portion such as conveying portion 80, discussed above.

Figure 19:
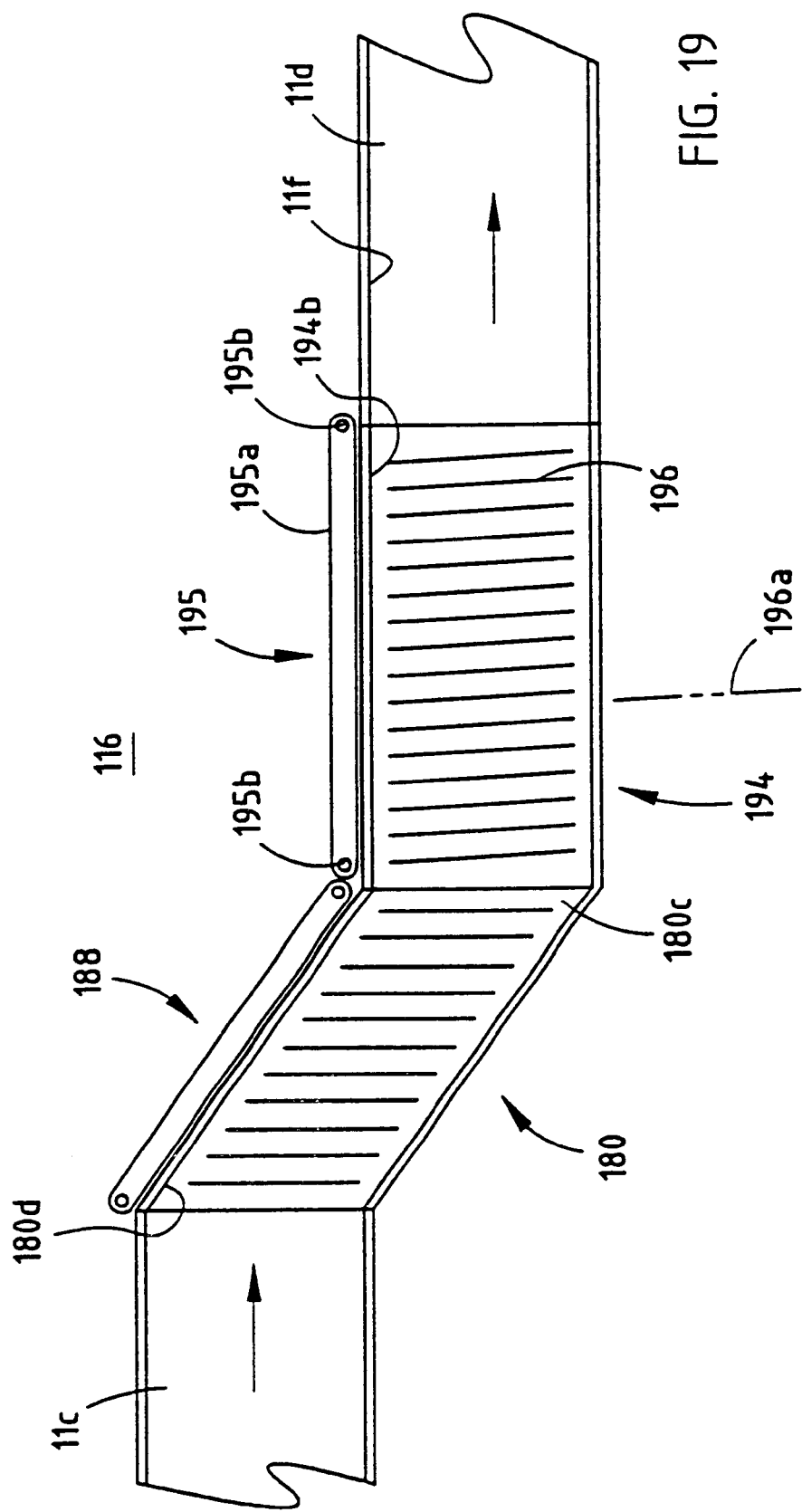
FIG. 19 is a top plan view of an aligning and accumulating conveyor in accordance with the present invention.

Referring now to FIG. 19, an alternate embodiment of an article aligning conveyor or article aligner 116 of the present invention is positioned between upstream conveying portion 11c and downstream or take-away conveying portion 11d. Aligning conveyor 116 is operable to generally align articles along one side 11f of the downstream conveyor 11d, similar to aligners 16 and 16', discussed above. Aligning conveyor 116 includes an angled conveying portion 180 and a second conveying portion or accumulator 194 positioned between a downstream end 180c of the angled conveying portion 180 and take-away conveyor 11d. The second conveying portion 194 provides a means for aligning the articles as they are discharged onto the output or takeaway conveyor.

Each of the conveying portions 180, 194 includes a vertical conveyor 188 and 195 positioned along a downstream side 180d, and a corresponding side 194b of the respective conveying portions 180, 194. The first conveying portion 180 and vertical conveyor 188 are substantially similar to conveying portion 80 and vertical conveyor 88, discussed above with respect to aligning conveyor 16, such that a detailed description will not be repeated herein. Likewise, vertically oriented conveyor 195 includes a vertical continuous conveying belt 195a which is driven and guided about a pair of rollers 195b at opposite ends of vertical conveyor 195, and is substantially similar to vertical conveyor 88, discussed above, such that a detailed discussion of vertical conveyor 195 will not be included herein.

Second conveying portion 194 includes a plurality of rollers 196 which are rotatably driven by a motor and belt, chain or the like (not shown) to convey articles from the first conveying portion 180 to take-away conveyor 11d. Rollers 196 are skewed or angled with respect to the direction of conveyance, such that the rollers are rotatable about axes 196a which are not normal or perpendicular to the direction of conveyance of the articles along the take-away conveyor 11d. In the illustrated embodiment, the axes 196a of rollers 196 are skewed approximately three degrees. Rollers 196 are skewed such that the rollers move articles toward vertical conveyor 195 along side 194b of conveying portion 194, to insure that the articles are guided along the side 194b of conveying portion 194 prior to being discharged onto takeaway conveyor 11d. This substantially precludes any of the articles from being offset from the side of the conveying portion as a result of the high-speed conveyance along the first angled conveying portion 180. Similar to conveying portion 80 and 80', vertical conveyor 195 may be operable at a slower speed than the speed of the rollers 196, in order to slow down articles as they engage belt 195a of vertical conveyor 195, in order to further ensure that no articles are positioned side by side one another as they are discharged from aligning conveyor 116. Accordingly, substantially all of the articles being discharged from aligning apparatus 116 are aligned and arranged in an organized manner along side 11f of take-away conveyor 11d. Although described as having the vertical conveyor belt which conveys articles at a slower speed than articles being conveyed by the rollers of aligning conveyor 116, clearly the scope of the present includes an aligning conveyor or apparatus which has a vertical conveyor belt moving at substantially the same speed as the rollers or even at a higher rate of speed than the rollers.

As articles are discharged from the output of the de-stacking conveyor, the side by side eliminating conveyor and/or the aligning conveyor, discussed above, a gap may exist between each adjacent article. Because articles are received by the input conveyor of the de-stacking or article separation conveyor in a clustered, random order, the gap between adjacent articles discharged from the output conveyor may vary. Consequently, one of the take-away conveyors 11b, 11c, 11d may be configured to selectively increase and/or decrease its speed and/or temporarily shut down so that a uniform gap may be achieved between the articles traveling along the take-away conveyor. The take-away conveyor may be an adjustable speed conveyor or may be equipped with a speed reducer or the like. Adjusting the speed of, or temporarily shutting down, the take-away conveyor enables the distance between adjacent articles to be increased or decreased as may be necessary to provide a largely uniform spacing between adjacent articles on the take-away conveyor. Achieving a substantially uniform spacing between articles increases the efficiency of the scanning procedure and results in a greater throughput. Any adjustable speed conveyor commonly utilized in the art having the requisite speed variation may be employed with the de-stacking or article separation conveyor of the present invention. Additionally, the speed of the conveyors of the destacker, side by side eliminator and/or aligner may be adjusted to adjust the gaps between articles being conveyed therealong.

Although conveyor system 10 is shown in FIG. 1 as having a generally square or rectangular loop destacker 12, with a side by side eliminating apparatus 14 positioned along an upper level of the destacker and upstream of aligning apparatus 16', clearly other configurations of the conveyor system may be implemented, depending on the floor space and the particular application, without affecting the scope of the present invention. For example, as shown in FIGS. 20–22, alternate layouts or configurations of conveyor systems in accordance to the present invention may be implemented to de-stack, separate and align articles input into the system prior to the articles being inducted onto a continuous sorter conveying loop. For example, as shown in FIG. 20, a conveyor system 110 includes destacking apparatus 12', which is arranged such that the conveying portions 28', 30', 36' are arranged in line, and not orthogonal to one another, as discussed above. The side by side eliminating apparatus 214 is configured immediately downstream of destacker 12' to receive articles from the last inclined conveyor 36' and is arranged to redirect articles laterally such that the articles are discharged onto the offset aligning and accumulating conveyor 116. Because the discharge conveyor 266 of side by side eliminator 214 is laterally offset from the input conveyor 262, aligning conveyor portion 180 may be selected to be longer in order to convey articles back to downstream take-away conveyor 11d, which may be generally aligned with, or may be offset from, the input conveyor 11a of the conveyor system 110. The operation and other details of the components of conveyor system 110 are generally identical to conveyor system 10, discussed above, such that a detailed description will not be repeated herein.

Examples of other configurations are shown in FIGS. 21 and 22, without the details of the sortation system 22. More particularly, FIG. 21 shows a conveyor system 210 having in line destacking conveyor 12' which feeds articles onto the three belt side by side eliminating conveyor 14, which further feeds articles onto aligning conveyor 116, such that the destacking and aligning process is performed in a generally linear conveying system. Alternately, as shown in FIG. 22, a conveyor system 310 includes in line destacking conveyor 12, which feeds articles onto side by side eliminator 314, which further feeds the articles onto aligning conveyor 116. In the illustrated embodiments, the conveyor systems are configured between an input conveyor 24 and one or more conveying sections 26, which feed the articles onto an induction station 22a of a sortation system 22. As discussed above, the conveying sections 26 may include gap setting conveyors 26a, identification or scanning conveyors or devices 26b, scale conveyors 26c, incline conveyors 26d, orientation conveyors 26e and/or the like, to identify and arrange the articles on the conveyor prior to induction onto the induction station 22a of sortation system 22.

Therefore, the present invention provides a conveyor system which is operable to convey articles from an input conveyor toward an induction station of a sortation system. The conveyor system is operable to de-stack and align articles being conveyed therealong via at least one of a destacking conveyor, a side by side eliminating conveyor, and/or an aligning conveyor, whereby the articles discharged from the conveyor system are substantially aligned and spaced along a take-away conveyor.

The destacking conveyor of the present invention provides a plurality of inclined conveying portions, each of which conveys articles upward along the inclined conveying portion, whereby the articles are guided from a discharge end of each inclined conveying portion to an input end of the next or subsequent inclined conveying portion via a chute or drop off. The inclined conveying portions may be arranged generally orthogonal to one another, such that the destacking conveyor forms a generally squared loop, or the inclined conveying portions may be generally aligned with one another. Preferably, each of the conveying portions is operable at a successively greater speed than the previous adjacent or upstream conveying portion. The angle of incline may also vary between conveying portions to enhance separation of the articles. The destacking conveyor assembly is configured to de-stack and separate the articles traveling therealong and to increase the separation distance between the articles as the articles move from the input conveyor to the output conveyor. Upon discharge from the de-stacking conveyor, the articles are generally unstacked and separated from one another.

In one form of the present invention, the article destacking conveyor includes a plurality of cascading conveyors, each of which is operated at a successively higher speed. Employing a destacking conveyor system having a plurality of cascading conveyors, and operating each conveyor at a progressively higher speed, effectively de-stacks and separates articles by utilizing gravity to effect the tumbling or falling action of the articles as they are conveyed. Additionally, the conveyor portions may be mounted to a vertically adjustable support member, which allows the destacking conveyor to be raised or lowered to accommodate existing conveyor lines.

The side by side eliminating conveyor of the present invention may be positioned downstream from the destacking conveyor to further destack and separate articles being conveyed along the conveyor system. The article singulator or side by side eliminator is operable to unstack and generally align articles or packages being conveyed therethrough. The singulator provides an inexpensive means for destacking articles and orienting the articles in a generally in line manner as they are continuously conveyed therealong. Optionally, the singulator may be implemented at a single conveying surface or at two or three conveying surfaces. The conveying surfaces may be positioned at different heights and may be operable at different speeds, and may even provide different gripping characteristics, in order to separate and create sufficient gaps between the articles being conveyed therealong.

The an aligning conveyor of the present invention may also be positioned downstream from the side by side eliminator to align the articles along one side of the take-away conveyor. The aligning conveyor is operable to align the articles in a generally linear manner along the take-away conveyor at a downstream end of the aligning conveyor. The aligning conveyor includes an angled conveying portion which is positioned between an upstream conveyor and a downstream conveyor, which is laterally offset from the upstream conveyor. The angled conveyor is preferably a roller conveyor with rollers extending thereacross generally normal to the direction of conveyance of the input conveyor. The angled conveyor includes a vertical conveyor belt along a downstream side of the conveyor to guide and convey the articles along the downstream side of the aligning conveyor and further onto and along a corresponding side of the downstream or take-away conveyor. The vertical conveyor belt may be curved to provide a smooth transition onto the take-away conveyor to limit lateral movement of the articles as they are discharged onto the take-away conveyor. Preferably, a lower edge of the vertical conveyor belt is positioned below a conveying surface defined by the rollers, in order to substantially preclude articles from becoming lodged between the belt and the rollers.

Optionally, a second conveying portion or accumulating conveyor may be positioned between the angled conveyor and the take-away conveyor to guide any articles which may be misaligned back into alignment along one side of the accumulating conveyor prior to discharging the articles onto the take-away conveyor. The accumulating conveying portion may include a plurality of slightly skewed rollers which are angled relative to the sidewalls of the conveying portion to move articles both downstream and generally toward the sidewall of the conveying portion, whereby the articles are aligned along the sidewall of the conveying portion before they are discharged onto the take-away conveyor.

Optionally, the conveyance speeds of one or more of the conveying portions of the conveyor system of the present invention may be increased or decreased in response to detection of an insufficient or excessive gap distance between articles being conveyed therealong. The speeds may be adjusted to decrease or increase the gap or separation distance so as to arrange the articles at approximately an appropriate distance apart to ease the downstream identification and orientation processes. The speeds may be continuously adjustable and may be adjusted a selected amount and/or may be adjusted in proportion to the speeds of the other conveying portions.

Although shown and described as a single system having a destacking conveyor, a side by side eliminating conveyor and an aligning conveyor, each of these conveyors may be implemented independently from one another to separate and de-stack and generally align articles conveyed therealong. One or more of the conveying devices may be implemented depending on the floor space and desired result of the particular application of the conveyor system. Preferably, the conveyor system includes all three conveyor devices, with the destacking conveyor being positioned upstream of the side by side eliminating conveyor, which is further positioned upstream of the aligning conveyor. However, other combinations or applications of the conveying devices of the present invention may be implemented, without affecting the scope of the present invention.

Changes and modifications in the specifically described embodiments can be carried out without departing from the principles of the invention, which is intended to be limited only by the scope of the appended claims, as interpreted according to the principles of patent law.

The embodiments of the invention in which an exclusive property or privilege is claimed are defined as follows:

1. An article aligning conveyor for aligning articles in a generally in line manner as they are conveyed along a conveyor, said article aligning conveyor comprising:

an input conveyor having a discharge end;

an output conveyor having an input end and being laterally offset from said input conveyor;

an angled conveyor positioned between said discharge end of said input conveyor and said input end of said output conveyor, said angled conveyor having a downstream side and being operable to convey articles in a same direction of conveyance as said input and output conveyors from said input conveyor generally toward said downstream side onto said output conveyor;

a vertically oriented conveyor positioned along said downstream side of said angled conveyor, said vertically oriented conveyor defining a generally vertical conveying surface along said downstream side of said angled conveyor; and aligning means for aligning articles such that they are discharged in a generally in line manner onto said output conveyor, wherein said aligning means comprises an arcuate conveyor section, said angled conveyor including an angled portion positioned at and angled with respect to said discharge end of said input conveyor and an aligned portion aligned with said input end of said output conveyor, said arcuate conveyor section providing a generally smooth transition between said angled portion and said aligned portion.

2. The aligning conveyor of claim 1, wherein said angled conveyor comprises a roller conveyor having a plurality of rollers.

3. The aligning conveyor of claim 2, wherein said plurality of rollers are rotatable about axes generally normal to a direction of conveyance of at least one of said input and output conveyors.

4. The aligning conveyor of claim 1, wherein said angled conveyor comprises a roller conveyor having a plurality of rollers.

5. The aligning conveyor of claim 4, wherein said plurality of rollers are rotatable about axes generally normal to a direction of conveyance of at least one of said input and output conveyors.

6. The aligning conveyor of claim 5, wherein said aligning means further includes an arcuate vertically oriented conveyor which provides a curved conveying surface along said downstream side of said roller conveyor.

7. The aligning conveyor of claim 6, wherein said vertically oriented conveyor comprises a belt conveyor having an endless conveyor belt guided along a curved plate at said downstream side of said roller conveyor.

8. The aligning conveyor of claim 7, wherein said endless conveyor belt is positioned such that a lower edge of said belt is positioned below a conveying surface defined by said plurality of rollers.

9. The aligning conveyor of claim 7, wherein said vertically oriented conveyor is operable at a first speed and said roller conveyor is operable at a second speed, said second speed being different from said first speed.

10. The aligning conveyor of claim 8, wherein said second speed is greater than said first speed.

11. An article aligning conveyor for aligning articles in a generally in line manner as they are conveyed along a conveyor, said article aligning conveyor comprising:

an input conveyor having a discharge end;

an output conveyor having an input end and being laterally offset from said input conveyor;

an angled conveyor positioned between said discharge end of said input conveyor and said input end of said output conveyor, said angled conveyor having a downstream side and being operable to convey articles in a same direction of conveyance as said input and output conveyors from said input conveyor generally toward said downstream side and onto said output conveyor;

a vertically oriented conveyor positioned along said downstream side of said angled conveyor, said vertically oriented conveyor defining a generally vertical conveying surface along said downstream side of said angled conveyor; and aligning means for aligning articles such that they are discharged in a generally in line manner onto said output conveyor, said vertically oriented conveyor comprising a belt conveyor having an endless conveyor belt guided along said downstream side of said angled conveyor, said endless conveyor belt being positioned such that a lower edge of said belt is positioned below a conveying surface defined by said angled conveyor, wherein said aligning means comprises an arcuate vertically oriented belt conveyor which is curved to provide a smooth transition between an angled portion at said input conveyor and angled with respect thereto and an aligned portion at said output conveyor and generally aligned with respect thereto.

12. An article aligning conveyor for aligning articles in a generally in line manner as they are conveyed along a conveyor, said article aligning conveyor comprising:

an input conveyor having a discharge end;

an output conveyor having an input end and being laterally offset from said input conveyor;

an angled conveyor positioned between said discharge end of said input conveyor and said input end of said output conveyor, said angled conveyor having a downstream side and being operable to convey articles in a same direction of conveyance as said input and output conveyors from said input conveyor generally toward said downstream side and onto said output conveyor;

a vertically oriented conveyor positioned along said downstream side of said angled conveyor, said vertically oriented conveyor defining a generally vertical conveying surface along said downstream side of said angled conveyor; and aligning means for aligning articles such that they are discharged in a generally in line manner onto said output conveyor, wherein said aligning means comprises a second conveyor positioned between a downstream end of said angled conveyor and said input end of said output conveyor, said second conveyor being generally aligned with said output conveyor and including a plurality of second rollers rotatable about second axes skewed with respect to a direction generally normal to the direction of conveyance of said output conveyor, said second rollers being skewed to convey articles downstream toward said output conveyor and toward a first side of said second conveyor, said first side being adjacent to said downstream side of said angled conveyor.

13. The aligning conveyor of claim 12, wherein said aligning means comprises at least one of an arcuate conveyor section and an arcuate vertically oriented conveyor section.

14. The aligning conveyor of claim 12, wherein said vertically oriented conveyor comprises a belt conveyor having an endless conveyor belt guided along said downstream side of said angled conveyor.

15. The aligning conveyor of claim 14, wherein said endless conveyor belt is positioned such that a lower edge of said belt is positioned below a conveying surface defined by said angled conveyor.

16. The aligning conveyor of claim 14, wherein said vertically oriented conveyor is operable at a first speed and said angled conveyor is operable at a second speed, said second speed being different from said first speed.

17. The aligning conveyor of claim 16, wherein said second speed is greater than said first speed.

18. The aligning conveyor of claim 12, wherein said angled conveyor comprises a roller conveyor including a plurality of rollers which are rotatable about first axes generally normal to the direction of conveyance of at least one of said input and output conveyors.

19. The aligning conveyor of claim 12, including at least one generally rigid redirecting member positioned along one of said input conveyor and said output conveyor and operable to redirect and arrange articles in a generally in line and unstacked manner while said at least one of said input conveyor and said output conveyor is operable to continuously convey the articles therealong.

20. An article aligning conveyor for aligning articles in a generally in line manner as they are conveyed along a conveyor, said article aligning conveyor comprising:
an input conveyor having a discharge end;
an output conveyor having an input end and being laterally offset from said input conveyor;
an angled conveyor positioned between said discharge end of said input conveyor and said input end of said output conveyor, said angled conveyor having a downstream side and being operable to convey articles in a same direction of conveyance as said input and output conveyors from said input conveyor generally toward said downstream side and onto said output conveyor;
a vertically oriented conveyor positioned along said downstream side of said angled conveyor, said vertically oriented conveyor defining a generally vertical conveying surface along said downstream side of said angled conveyor;
aligning means for aligning articles such that they are discharged in a generally in line manner onto said output conveyor; and
at least one generally rigid redirecting member positioned along one of said input conveyor and said output conveyor and operable to redirect and arrange articles in a generally in line and unstacked manner while said at least one of said input conveyor and said output conveyor is operable to continuously convey the articles therealong, wherein said at least one generally rigid redirecting member comprises:
a first redirecting member extending from a first side of said at least one of said input conveyor and said output conveyor and positioned at least partially across said at least one of said input conveyor and said output conveyor; and
a second redirecting member extending from an opposite second side of said at least one of said input conveyor and said output conveyor and positioned at least partially across said at least one of said input conveyor and said output conveyor, wherein articles are redirected by said first and second redirecting members as the articles are continuously conveyed along said at least one of said input conveyor and said output conveyor.

21. The aligning conveyor of claim 20, wherein said first and second redirecting members are rigidly positioned at an angle at least partially across said at least one of said input conveyor and said output conveyor.

22. The aligning conveyor of claim 20, wherein said at least one of said input conveyor and said output conveyor comprises an upstream conveying surface and a downstream conveying surface, said first redirecting member being positioned at said upstream conveying surface and said second redirecting member being positioned at said downstream conveying surface.

23. The aligning conveyor of claim 22, said downstream conveying surface is operable at a higher rate of speed than said upstream conveying surface.

24. The aligning conveyor of claim 20, wherein said at least one of said input conveyor and said output conveyor comprises an upstream conveying surface, a side conveying surface and a downstream conveying surface, said first redirecting member being positioned at said upstream conveying surface and said second redirecting member being positioned at said side conveying surface.

25. The aligning conveyor of claim 24, said first redirecting member is operable to redirect articles from said upstream conveying surface to said side conveying surface and said second redirecting member is operable to redirect articles from said side conveying surface to said downstream conveying surface.

26. The aligning conveyor of claim 23, wherein said upstream conveying surface is at a first height and an upstream end of said side conveying surface is at a second height, said first height being greater than said second height.

27. The aligning conveyor of claim 26, wherein a downstream end of said side conveying surface is at a third height and said downstream conveying surface is at a fourth height, said third height being greater than said fourth height.

28. The aligning conveyor of claim 27 further including at least one transition plate positioned between at least one of said upstream and side conveyors and said side and downstream conveyors.

29. The aligning conveyor of claim 27, wherein said side conveying surface is inclined to convey articles upward therealong.

30. The aligning conveyor of claim 27, wherein said upstream conveying surface is operable at a first speed and said side conveying surface is operable at a second speed, said second speed being greater than said first speed.

31. The aligning conveyor of claim 30, wherein said downstream conveying surface is operable at a third speed, said third speed being greater than said second speed.

32. The aligning conveyor of claim 25, wherein said upstream conveying surface is operable at a first speed and said side conveying surface is operable at a second speed, said second speed being greater than said first speed.

33. The aligning conveyor of claim 32, wherein said downstream conveying surface is operable at a third speed, said third speed being greater than said second speed.

34. The aligning conveyor of claim 25, wherein said side conveying surface is operable at a first speed and said downstream conveying surface is operable at a second speed, said second speed being greater than said first speed.

35. The aligning conveyor of claim 25, wherein at least one of said upstream conveying surface and said side conveying surface has a first coefficient of friction and said downstream conveying surface has a second coefficient of friction, said second coefficient of friction being greater than said first coefficient of friction.

36. The aligning conveyor of claim 20, wherein said at least one of said input conveyor and said output conveyor comprises at least one of a continuous belt surface and a powered roller surface.

37. The aligning conveyor of claim 20, wherein said at least one generally rigid redirecting member is positioned along said input conveyor.

38. The aligning conveyor of claim 20, wherein said at least one generally rigid redirecting member is positioned along said output conveyor.

39. An article aligning conveyor for aligning articles in a generally in line manner as they are conveyed along a conveyor, said article aligning conveyor comprising:
an input conveyor having a discharge end;
an output conveyor having an input end and being laterally offset from said input conveyor;
an angled conveyor positioned between said discharge end of said input conveyor and said input end of said output conveyor, said angled conveyor having a downstream side and being operable to convey articles in a same direction of conveyance as said input and output conveyors from said input conveyor generally toward said downstream side and onto said output conveyor;
a vertically oriented conveyor positioned along said downstream side of said angled conveyor, said vertically oriented conveyor defining a generally vertical conveying surface along said downstream side of said angled conveyor; and
aligning means for aligning articles such that they are discharged in a generally in line manner onto said output conveyor, wherein said input conveyor includes:
a first conveyor operated at a first speed, at least a portion of said first conveyor being inclined and having an output end;
a second conveyor operated at a second speed, at least a portion of said second conveyor being inclined, said second conveyor having an input end proximate to and at a height at least partially below a height of said output end of said first conveyor, said second conveyor being positioned generally orthogonal to said first conveyor, said first and second conveyors being continuously operable to convey articles along said aligning conveyor, said second speed being greater than said first speed; and
a discharge conveyor generally aligned with a direction of conveyance of an input to said input conveyor, said conveyors of said aligning conveyor being arranged to define a generally circular loop.

40. The aligning conveyor of claim 39, wherein said at least a portion of said first and second conveyors are upwardly sloped such that said output end of said first conveyor is above an input end of said input conveyor and an output end of said second conveyor is above said input end of said second conveyor.

41. The aligning conveyor of 40, wherein said first conveyor includes a first generally horizontal conveying portion having an input end, a first chute and a first inclined conveyor portion, said first chute being configured to guide articles from said first horizontal conveying surface onto an input end of said first inclined conveyor portion, said input end of said first inclined conveyor portion being at a level below said output end of said first conveyor.

42. The aligning conveyor of claim 41, wherein said second conveyor includes a second generally horizontal conveying portion having an input end, a second chute and a second inclined conveyor portion, said second chute being configured to guide articles from said second horizontal conveying surface onto an input end of said second inclined conveyor portion, said input end of said second inclined conveyor portion being at a level below said output end of said second conveyor.

43. The aligning conveyor of claim 42, wherein said chutes are angled to direct articles sidewardly toward one side of a respective one of said first and second conveyors as the articles move down along said chutes.

44. The aligning conveyor of claim 43, said first inclined conveyor portion is operable at a greater speed than said first horizontal conveyor portion, said second inclined conveyor portion being operable at a greater speed than said second horizontal conveyor portion.

45. The aligning conveyor of claim 44, wherein said second horizontal conveyor portion is operable at a greater speed than said first inclined conveyor portion.

46. The aligning conveyor of claim 45 further including at least one gap sensor at at least one of said first and second conveyors, said gap sensor being operable to detect an amount of separation between articles being conveyed along said aligning conveyor.

47. The aligning conveyor of claim 46, wherein said speeds of said first and second conveyor portions are adjustable in response to said gap sensor.

48. The aligning conveyor of claim 47, wherein said speeds of said first and second conveyor portions are proportionate to one another, said speeds being adjustable in response to said gap sensor such that said speeds of said conveyor portions remain at substantially the same proportions to one another after the adjustment.

49. The aligning conveyor of claim 39 further including at least one gap sensor at at least one of said first and second conveyors, said gap sensor being operable to detect an amount of separation between articles being conveyed along said aligning conveyor.

50. The aligning conveyor of claim 49, wherein said speeds of said conveyor portions are adjustable in response to said gap sensor.

51. The aligning conveyor of claim 50, wherein said speeds of said conveyor portions are proportionate to one another, said speeds being adjustable in response to said gap sensor such that said speeds of said conveyor portions remain at substantially the same proportions to one another after the adjustment.

52. The aligning conveyor of claim 39, wherein said input conveyor further includes a third conveyor operated at a third speed, at least a portion of said third conveyor being inclined and having an output end, said first conveyor being positioned generally orthogonal to said input conveyor and receiving articles therefrom, said third conveyor being positioned generally orthogonal to said second conveyor and receiving articles therefrom, said discharge conveyor being positioned generally orthogonal to said third conveyor and receiving articles therefrom.

53. The aligning conveyor of claim 52, wherein said first, second and third conveyors include upwardly inclined portions such that said discharge conveyor is positioned generally above said input to said input conveyor.

54. The aligning conveyor of claim 52, wherein said first, second and third conveyors include downwardly inclined portions such that said discharge conveyor is positioned generally below said input to said input conveyor.

55. An article aligning conveyor for aligning articles in a generally in line manner as they are conveyed along a conveyor, said article aligning conveyor comprising:

input and output conveyors laterally offset from one another and operable to convey articles in a direction of conveyance;

a connecting conveyor connecting said input conveyor to said output conveyor, said connecting conveyor having a downstream side and being operable to convey articles in said direction of conveyance from said input conveyor generally toward said downstream side and onto said output conveyor;

a curved vertically oriented conveyor positioned along said downstream side of said connecting conveyor, said curved vertically oriented conveyor defining a generally vertical conveying surface along said downstream side of said connecting conveyor, said curved vertically oriented conveyor being curved so as to be generally parallel with said direction of conveyance at said output conveyor, said connecting conveyor and said curved vertically oriented conveyor being operable to align articles along said curved vertically oriented conveyor such that they are discharged in a generally in line manner onto said output conveyor; and a second connecting conveyor positioned between a downstream end of said connecting conveyor and said input end of said output conveyor, said second connecting conveyor including a plurality of first rollers rotatable about first axes skewed with respect to a direction generally normal to said direction of conveyance, said first rollers being skewed to convey articles downstream toward said output conveyor and toward a first side of said second connecting conveyor, said first side being adjacent to said downstream side of said connecting conveyor.

56. The aligning conveyor of claim 33, wherein said connecting conveyor comprises a roller conveyor having a plurality of rollers.

57. The aligning conveyor of claim 56, wherein said plurality of rollers are rotatable about axes generally normal to said direction of conveyance.

58. The aligning conveyor of claim 57, said curved vertically oriented conveyor comprises a belt conveyor having an endless conveyor belt guided along a curved plate at said downstream side of said connecting conveyor.

59. The aligning conveyor of claim 58, wherein said endless conveyor belt is positioned such that a lower edge of said belt is positioned below a conveying surface defined by said plurality of rollers.

60. The aligning conveyor of claim 58, wherein said curved vertically oriented conveyor is operable at a first speed and said roller conveyor is operable at a second speed, said second speed being different from said first speed.

61. The aligning conveyor of claim 60, wherein said second speed is greater than said first speed.

62. The aligning conveyor of claim 33, wherein said curved vertically oriented conveyor comprises a belt conveyor having an endless conveyor belt guided along said downstream side of said connecting conveyor.

63. The aligning conveyor of claim 62, wherein said endless conveyor belt is positioned such that a lower edge of said belt is positioned below a conveying surface defined by said connecting conveyor.

64. The aligning conveyor of claim 62, wherein said vertically oriented conveyor is operable at a first speed and said connecting conveyor is operable at a second speed, said second speed being different from said first speed.

65. The aligning conveyor of claim 64, wherein said second speed is greater than said first speed.

66. The aligning conveyor of claim 53, wherein said connecting conveyor comprises a roller conveyor including a plurality of second rollers which are rotatable about second axes generally normal to said direction of conveyance.

* * * * *

UNITED STATES PATENT AND TRADEMARK OFFICE
CERTIFICATE OF CORRECTION

PATENT NO.     : 6,609,607 B2
DATED          : August 26, 2003
INVENTOR(S)    : Bernard H. Woltjer et al.

It is certified that error appears in the above-identified patent and that said Letters Patent is hereby corrected as shown below:

Column 7,
Line 30, "lid" should be -- 11d --.

Column 9,
Line 11, "30b" should be -- 30h --.

Column 12,
Line 17, "13a" should be -- 130a --.

Column 27,
Line 28, insert -- and -- after "side".

Column 28,
Line 7, "Claim 8" should be -- Claim 9 --.

Column 30,
Line 26, insert -- wherein -- after "Claim 22,".
Line 36, insert -- wherein -- after "Claim 24,".
Line 42, "Claim 23" should be -- Claim 25 --.

Column 32,
Line 1, insert -- Claim -- before "40".
Line 22, insert -- wherein -- after "Claim 43,".

UNITED STATES PATENT AND TRADEMARK OFFICE
CERTIFICATE OF CORRECTION

PATENT NO. : 6,609,607 B2
DATED : August 26, 2003
INVENTOR(S) : Bernard H. Woltjer et al.

It is certified that error appears in the above-identified patent and that said Letters Patent is hereby corrected as shown below:

Column 34,
Lines 1 and 21, "Claim 33" should be -- Claim 55 --.
Line 7, insert -- wherein -- after "Claim 57,".
Line 35, "Claim 53" should be -- Claim 55 --.

Signed and Sealed this

Twenty-seventh Day of September, 2005

JON W. DUDAS
*Director of the United States Patent and Trademark Office*